May 2, 1961  G. G. LIGHT ET AL  2,982,809
TELEGRAPH WAY STATION SYSTEM
Filed Sept. 12, 1957  16 Sheets-Sheet 3

INVENTORS
G. G. LIGHT
W. J. WICHTENDAHL
BY
ATTORNEY

May 2, 1961

G. G. LIGHT ET AL 2,982,809

TELEGRAPH WAY STATION SYSTEM

Filed Sept. 12, 1957

INVENTORS
G. G. LIGHT
W. J. WICHTENDAHL

BY *J. H. Presson*

ATTORNEY

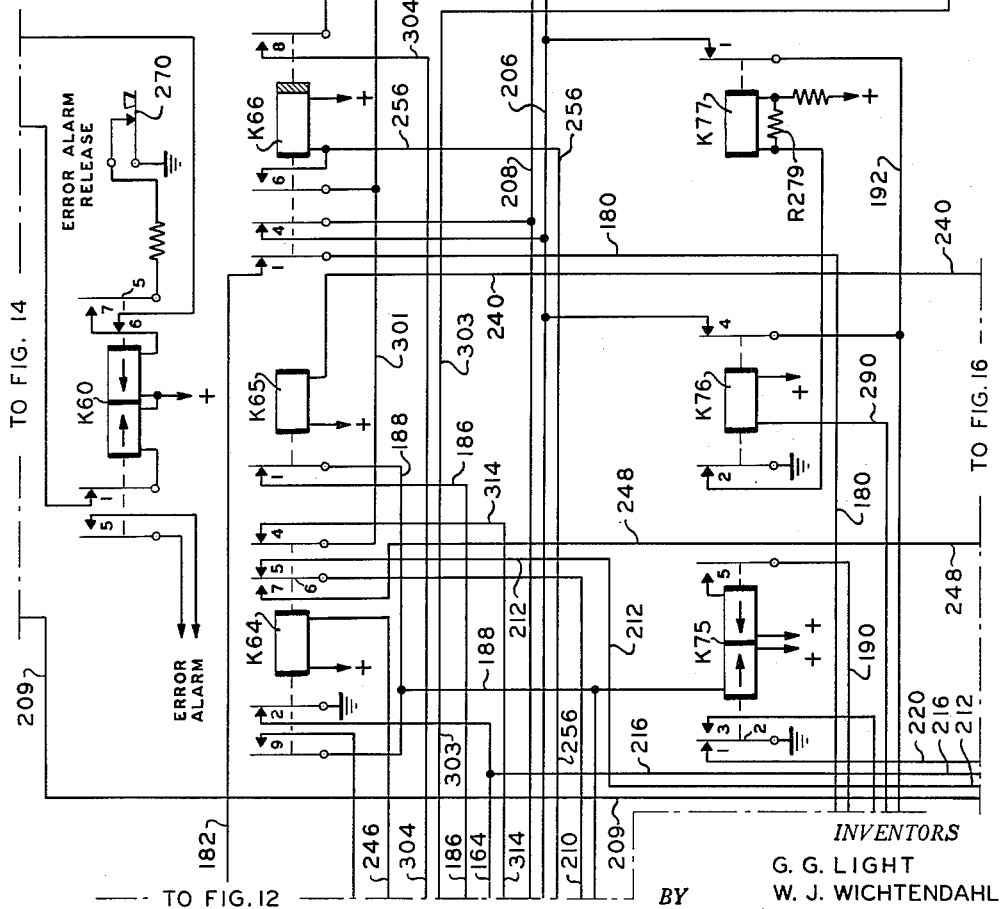

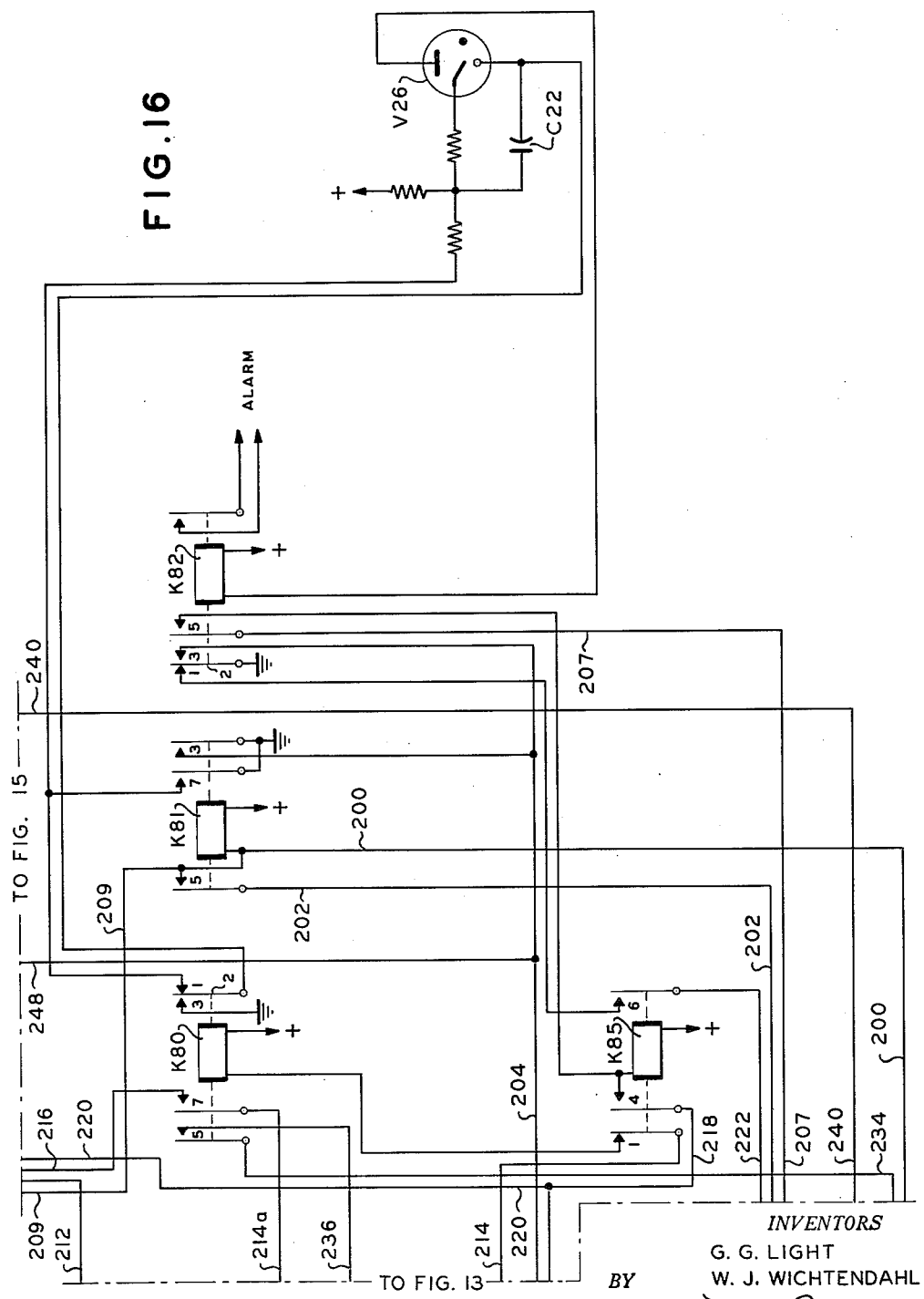

United States Patent Office 2,982,809
Patented May 2, 1961

2,982,809

TELEGRAPH WAY STATION SYSTEM

George G. Light, Scarsdale, and William J. Wichtendahl, New York, N.Y., assignors to The Western Union Telegraph Company, New York, N.Y., a corporation of New York Filed Sept. 12, 1957, Ser. No. 683,624

16 Claims. (Cl. 178—2)

This invention relates to a telegraph way station system, and more particularly to a system for effecting way station selection and selective communication between a main station, such as a central or terminal station, and the various way stations in a more expeditious manner.

In any way circuit arrangement that provides for individual station selection, some system of controls is necessary and some means must be provided for operatively connecting the controls in the circuit when control functions are to be performed and for disconnecting them when the control functions have been completed. Long "open" intervals and gating arrangements based on precise "timed" intervals are sometimes used, and additional safeguards must also be provided to assure that the control signals are not construed as message characters and that message characters do not function as control signals.

In a way circuit system in accordance with the instant invention, each way station has one or more keysets for transmitting keyset signals and also a printer for receiving teleprinter traffic. A transmitting distributor and a receiving distributor are provided at the central station and at each of the way stations, for transmitting and receiving keyset and teleprinter traffic, and these same distributors are also used for generating and reading control signals. When the line is idle all control circuits are activated and are responsive to particular teleprinter characters that are transmitted for control purposes. The cutting in and cutting out of the control circuits are based on the principle that either keyset or teleprinter traffic will always begin with a particular significant "start" character not otherwise used for other control functions and that transmission of a message ordinarily will be continuous.

Any time that transmission is stopped, the control circuits are automatically cut in. Therefore, should normal transmission be interrupted for any reason, guard circuits function to assure that the significant "start" control character is again transmitted just ahead of the resumed message transmission. This is of particular importance since the way stations, in addition to a keyset and a receiving printer, may have a tape transmitter for sending teleprinter traffic, and if transmission is interrupted, as by a tight tape condition, the "start" control character will automatically be transmitted before resumption of signals from the tape.

The way stations are invited on a sequential basis, and in order to conserve circuit time each station upon being invited has means operative in the event that it has no traffic to send for automatically transmitting the invitation character for the next station in the sequence.

One of the objects of the instant invention is to provide a way station system in which a plurality of stations in a way circuit are invited in rotation for the purpose of sending messages to the main station, and in which the time required for the invitation cycle is greatly reduced by means at the way stations operative in the event that an invited station has no message to transmit or does not have an allotted number of messages to transmit, for automatically sending an invitation signal to the succeeding station in the circuit.

Another object is the provision of a way station system of the character described, in which when a way station having message material to transmit is invited, the succeeding way station is invited automatically at the end of the transmission from the invited way station.

A further object is to provide, in a way station system, means for programming the invitation cycle to invite a selected way station a predetermined number of times during each invitation cycle, and in which when the selected station does not have the allotted number of messages to transmit it automatically signals that it has no further messages by inviting the succeeding station.

Still another object is a provision for skipping closed-out way stations wherein the next succeeding way station is invited to send when the way station prior to a closed-out station completes its message transmission or attempts to invite the closed-out station.

An additional object is to provide a way station system in which the way stations may send and receive both keyset and teleprinter messages to and from the main station, with means for differentiating between keyset traffic and teleprinter traffic.

Other objects and advantages will be apparent from the following detailed description of a system embodying the principles of the instant invention, taken in connection with the accompanying drawings in which:

Fig. 1 diagrammatically indicates the basic components of the way wire system;

Figs. 2, 3, 4 and 5 collectively comprise a schematic circuit diagram of the equipment and connections at one of the way stations;

Figs. 6 and 7 together show additional circuitry required in the event that a tape transmitter for sending teleprinter traffic is utilized with the way station of Figs. 2 to 5;

Figs. 8, 9, 10, 11, 12, 13, 14, 15 and 16 collectively comprise a schematic circuit diagram of the equipment and connections at the central, or terminal, station;

Fig. 17 shows the manner in which Figs. 2 to 7 should be arranged with respect to one another; and Fig. 18 similarly shows how Figs. 8 to 16 should be arranged.

Referring to Fig. 1, there is shown a way wire system in diagrammatic form, in which a way wire circuit L extends from a central or terminal station to a plurality of way stations, of which the first and last stations are depicted. The terminal station includes a receiving distributor 20 for receiving keyset messages and also teleprinter messages incoming from the way stations, and a transmitting distributor 22 for transmitting control signals and messages to the way stations. Control apparatus 23 is responsive to incoming signals over line L and includes means for distinguishing between keyset traffic and teleprinter traffic and for applying the keyset signals to receiving apparatus such as data processing equipment, for example, a computer 25, and receiving answer-back signals therefrom for retransmission to a calling keyset, and for applying incoming teleprinter message signals to a receiving teleprinter 25. The particular nature or kind of the data processing equipment at the central station responsive to the keyset signals, or the purpose for which it is employed does not per se form a part of the instant invention; such apparatus may, for example, comprise apparatus for magnetically or otherwise storing signals representing a running inventory in regard to merchandise stocks, supplies or other items, card punching and accounting machines, reservation systems for airlines and railroads, and other known equipment.

Each way station includes receiving and transmitting distributors 20' and 22', control equipment 23, and a keyset 27 for handling keyset traffic. While several keysets connectable in turn by an allotter switch in known manner may be employed, for simplicity only one keyset per way station is here illustrated. A printer 25' receives incoming teleprinter messages. Preferably, a tape transmitter 26' also is provided for transmitting teleprinter traffic to the central station, in which case the printer 25' will also print the outgoing messages.

*General description of operation*

By pushing a request button at any of the way stations, the operator at that station stores the fact that there is traffic (either keyset or teleprinter) at that station to be transmitted to the main station. If the line circuit L is idle, pushing the button also sends a 25 millisecond "open" to the line, and this open informs the central station that some way station has traffic to be picked up. Due to the fact that the generation of several opens almost simultaneously may be cause a teleprinter character to appear on the line, the stations are prevented from reading any characters until approximately 0.5 second after the recognition of the open. The open also puts on a lockout at all stations and this lockout prevents an open from going to the line when any more request buttons are pushed. After allowing approximately one second for the reading circuits at the stations to become active, one of the stations, preferably the main station as illustrated herein, automatically sends a particular selection character to invite the first way station in the invitation sequence (assume this character is the letter B). The character reading circuits, such as groups of relays, at the stations insure that the first station is the only one that can respond to the character B when used as a station selection character.

If the first station has no traffic to transmit, it automatically sends a particular selection character to invite the second station in the invitation sequence (assume this character is the letter C) in response to the B. On the other hand, if the first station has keyset traffic to transmit, it sends a particular functional character, such as the letter S, followed by the keyset data. The S informs the central office that the information following it is keyset data for the data processing equipment, for example, the computer shown. The S also cuts out all readers so that the traffic characters will not be treated as signaling characters. The message from the keyset, in the illustrative system disclosed, comprises a succession of characters stored on contacts of the keyset, which provide buffer storage, each of which characters contains four intelligence code pulses in binary form, commonly referred to as "bits" which is an abbreviation for "binary digits." Preferably, a fifth bit is added to each character to provide an "odd parity" check. The four bits of each character are set serially to the line, combined with start and stop pulses to form start-stop permutation code telegraph characters. At the control center, or main station, the received characters are checked for odd parity, and the four intelligence bits of each character are sent to the computer or other data processing equipment in parallel form.

At the end of an incoming keyset message, the data processing equipment instantly prepares a reply to be sent to the calling keyset station, and when the reply is ready the functional character S automatically is sent followed by the reply. The reply comprises one or more information characters each composed of four bits which are converted into start-stop permutation code telegraph characters as described above. The character S cuts out all readers (which in the meantime have been cut in) and allows the answerback information to be sent to the calling keyset. The characters are checked for parity and the four intelligence bits of each character are applied to the input of the calling keyset and energize lamps or other signal devices. There is no need to select the proper keyset station in order to send the reply because by their nature the keyset of a calling station accepts a reply only after a keyset message has been sent therefrom.

If the first way station has teleprinter traffic to transmit, the character "Space" is transmitted followed by the teleprinter traffic, this traffic being sent by means of a tape transmitter at the station. The Space character cuts out all readers and informs the central station that the information following is to be sent to the receiving printer there. The fact that the calling station is transmitting allows the Space to cut in the printer at that station. If transmission is interrupted, as by a tight tape condition or other reason, it must be stopped long enough to allow the readers to cut in. When transmission is to be resumed, it is automatically preceded by a Space to cut out all readers. At the end of the message the printer reads an end-of-message signal comprising Figure Shift, H, i.e., upper case H, and closes a contact which cuts out the printer and transmitter. If the transmitter is stopped for a predetermined period, for example, 20 seconds, the printer and transmitter are cut out automatically. After the end of the message is read, Blank and Letter Shift characters are stepped through the transmitter. When a character other than Blank or Letter Shift in the perforated tape comes over the pins of the transmitter, it stops stepping, and only when the transmitter had idled all the Blank and Letter Shift characters will the request button if depressed perform its designated function.

At the end of either the teleprinter message or the reply to the keyset, the main station automatically sends the selection character C to invite the second station in the invitation cycle. The second station reacts to the C character in the same manner as the first station reacted to the B character except that if there is no traffic it automatically sends another particular selection character to invite the third station. This continues with each station inviting the next, if it has no traffic, until the last station is invited, and if the last station has no traffic it automatically sends a Line Feed character.

If any traffic had been received during an invitation cycle (inviting the first through the last stations), the cycle is repeated. If no traffic had been received, a character (assume this character is the letter A) is sent to remove the lockout, and removing the lockout permits an open to go to the line if a request button is pushed.

The invitation cycle can be programmed to invite busy stations more frequently, since there is a switch for each station which permits it to be invited 0, 1, 2, 3, 4 or 5 times. If a station is closed out (invited 0 times) the main station automatically sends the invitation character to the next station in the sequence when it receives the character for the closed-out station. For example, if the second station was closed out, and the first station had no waiting traffic, the main station sends B, the first station B sends C, and the main station receives C and sends the invitation character for the third station. If a station is closed out and the station before it has traffic, the main station will invite the station beyond the closed-out station at the end of the message. If a station is allotted two or more successive messages and hence is to be invited more than once, it is invited 2, 3, 4 or 5 times (depending upon the switch setting) in succession until a "No" answer is received. The "No" answer in such case is when the station does not have its allotted number of messages to transmit, and upon termination of its traffic sends the invitation character of the next station.

Since power is not turned on at all way stations at the same time, it is possible for a station to come on during the transmission of a message. To prevent the message traffic from acting like signal characters, the station can not respond to signals until the line is idle for one second. To prevent the request signal from interfering with traffic, the lockout is on when the power is turned on. No station can send a request signal at the time the circuit is turned on, but the main station initiates an invitation cycle at definite periods of time, for example, every ten minutes, if no requests are received. Thus the traffic from the first station will be picked up ten minutes after the circuit is turned on.

The main station can only send teleprinter traffic when the line is idle or at the end of an invitation cycle. If the circuit is idle, a short open is sent to busy all stations and then there is a wait for the readers to cut in before the transmitter is started. If the circuit is busy the transmitter is started upon receipt of a "No" answer from the last station, which in this case is a Line Feed character if the station had no message to transmit, or at the end of the answerback to the last station in the event that it had keyset traffic, or upon receipt of an end-of-message signal in the case of teleprinter traffic from the station.

The character required to select the desired station must be in the tape followed by a Space character; the character selects the way station printer and the Space cuts in the printer and cuts out the readers. If transmission is stopped, it must be stopped long enough to allow the readers to cut in and transmission must be preceded by Space if it is restarted. If transmission is restarted without sending Space, the printer is cut out, and also if the transmitter does not start for twenty seconds, the printer is cut out. When the printer receives Figure Shift, H, Letter Shift, it is cut out.

Detailed description of way station circuits

Figure 1:
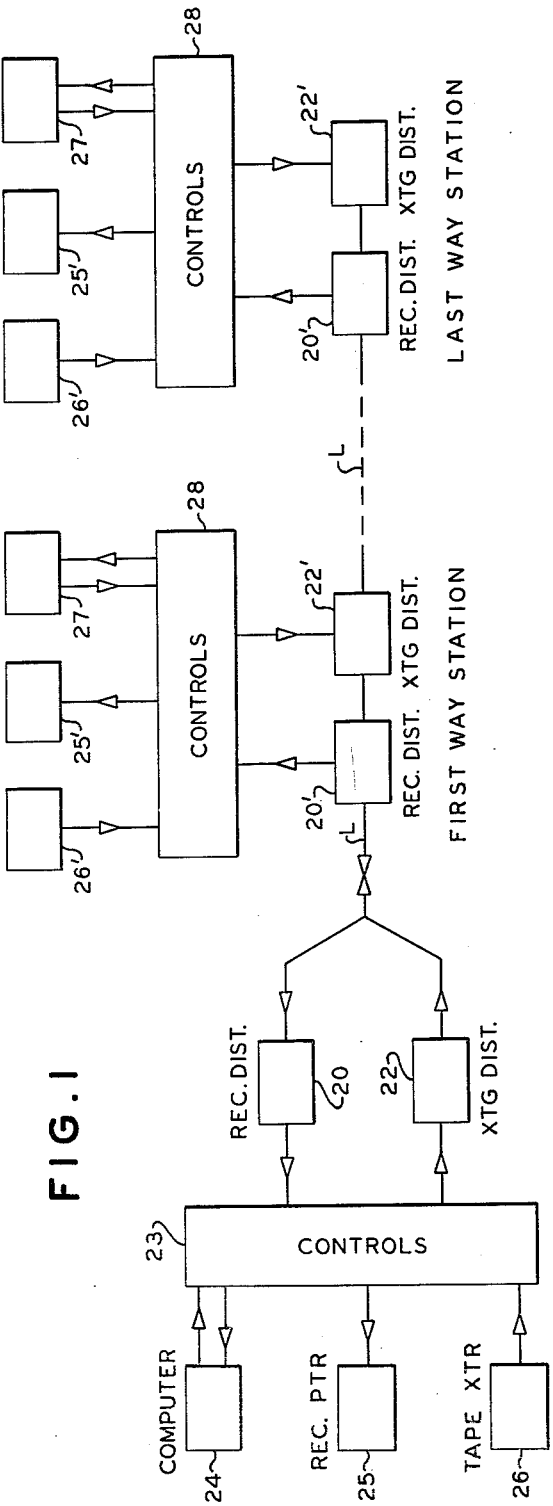
Figure 2:
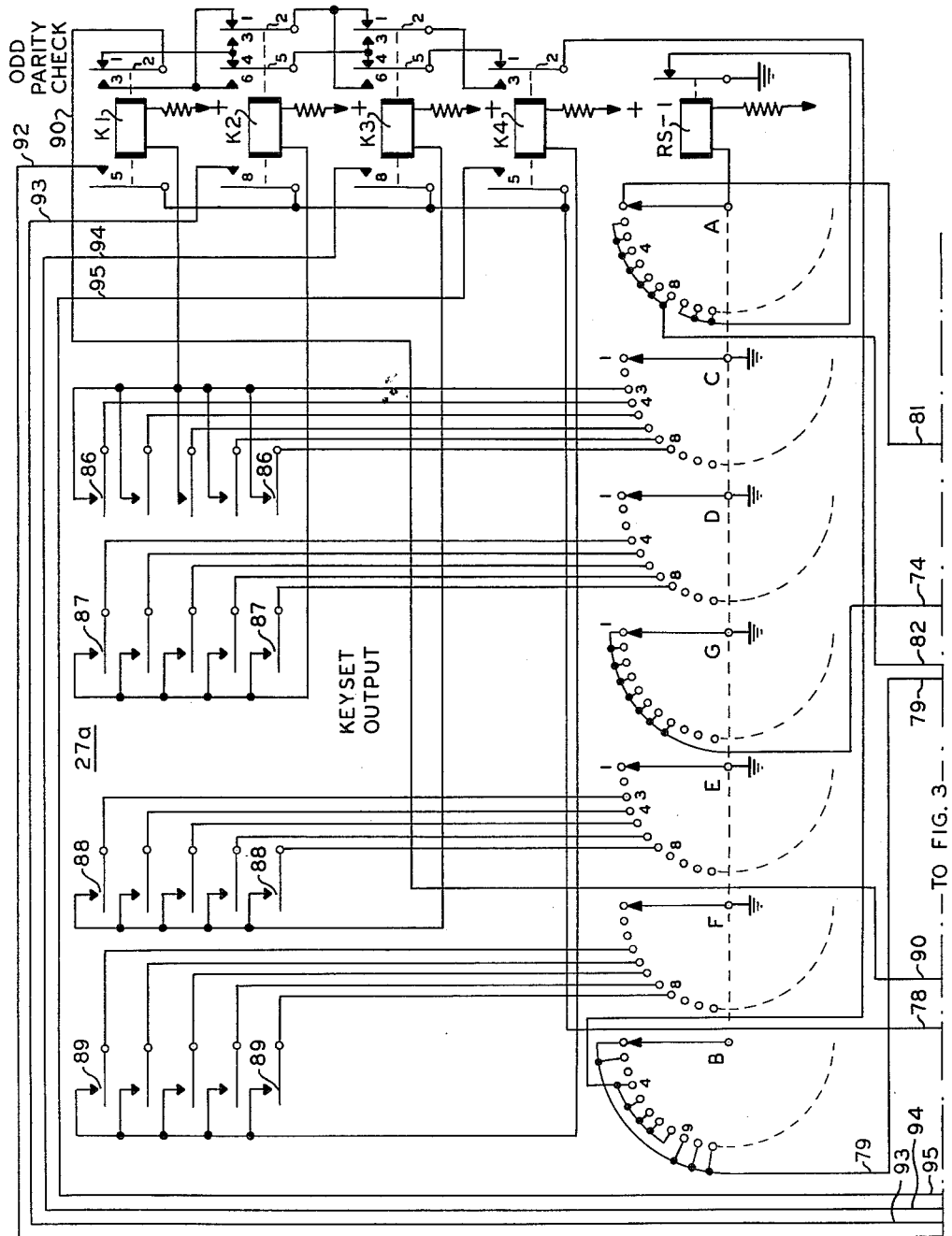
Figure 3:
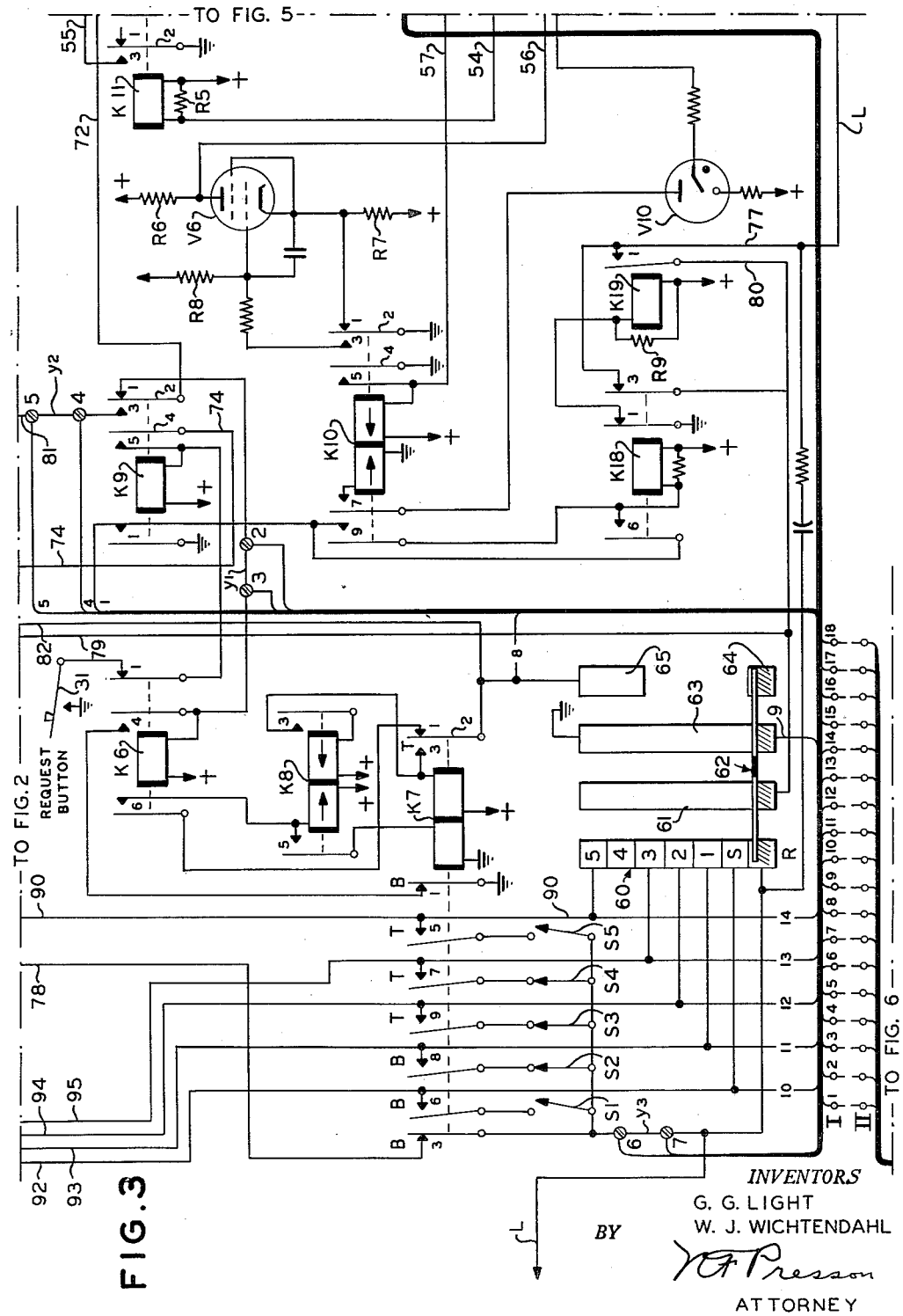
Figure 4:
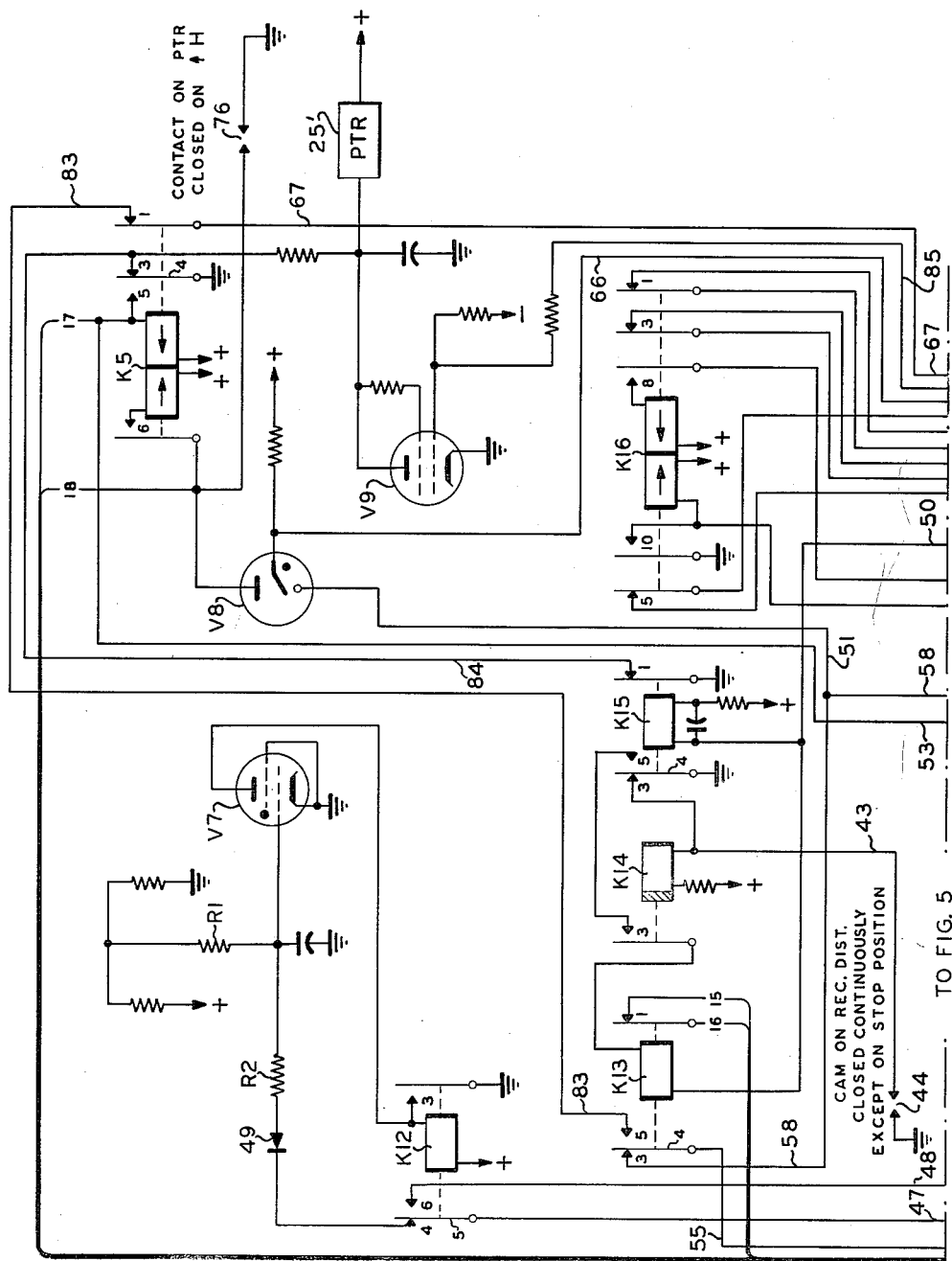
Figure 5:
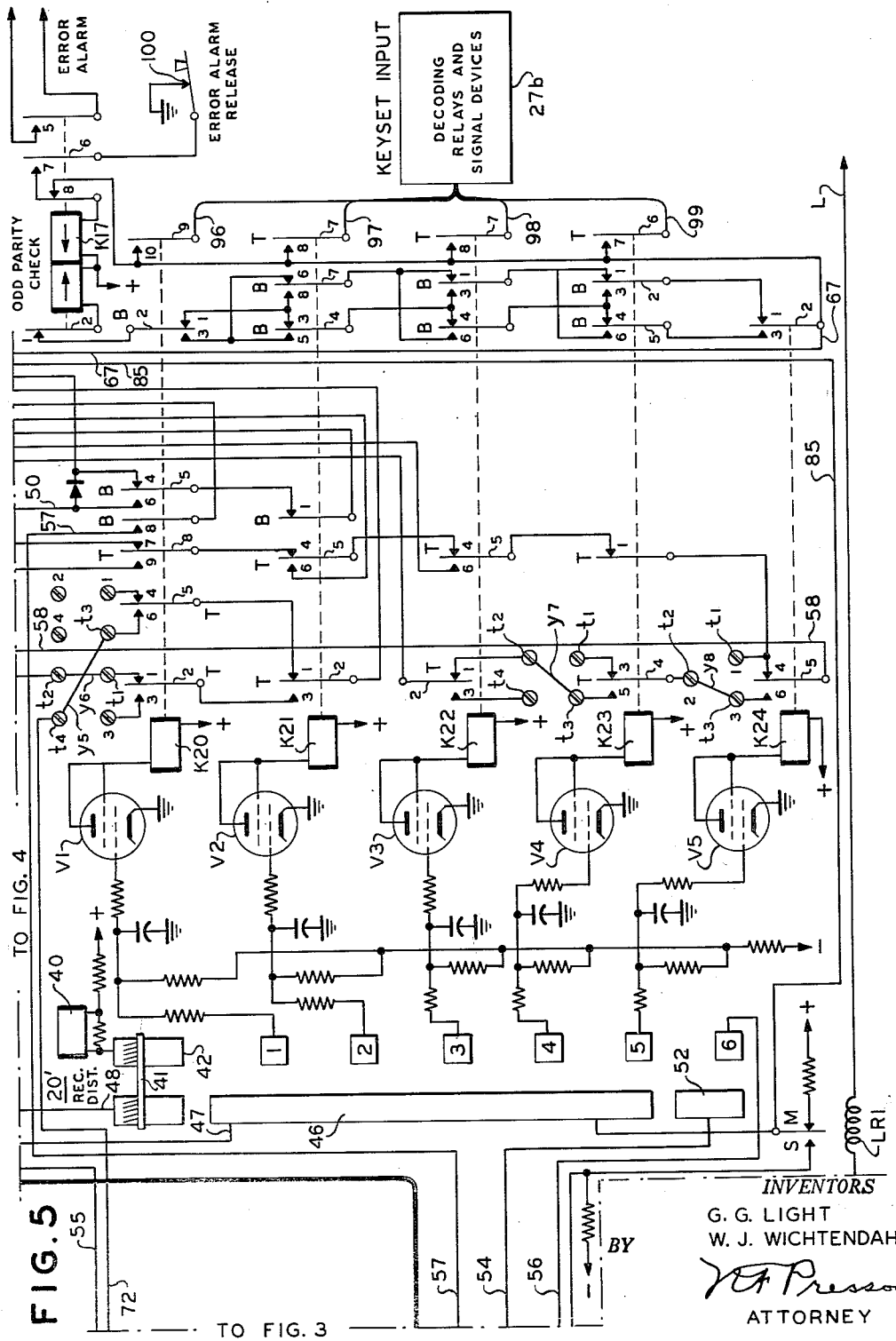

Figs. 2 to 5 inclusive show the circuitry of a way station essentially comprising the output portion 27a of a keyset, Fig. 2, a transmitting distributor 22', Fig. 3, a receiving printer 25, Fig. 4, and a receiving distributor 20' and the input portion 27b of the keyset, Fig. 5. The brush arm 62 of the transmitting distributor 22' is continuously rotated at constant speed by a motor so long as the station is open for the transmission and reception of traffic. Normally the distributor is shorted out, with respect to the line L, by a circuit comprising a conductor 78, switch arm and contacts of bank B of a rotary switch RS–1, Fig. 2, conductors 79 and 80, Fig. 3, and closed contacts 3 of a relay K18, and conductor 77, so that the distributor will not be in the line circuit until the keyset is ready to send to the line L. The start-stop receiving distributor 20' of Fig. 5, however, is normally in circuit with the tongue of a line receiving relay LR1.

Figure 6:
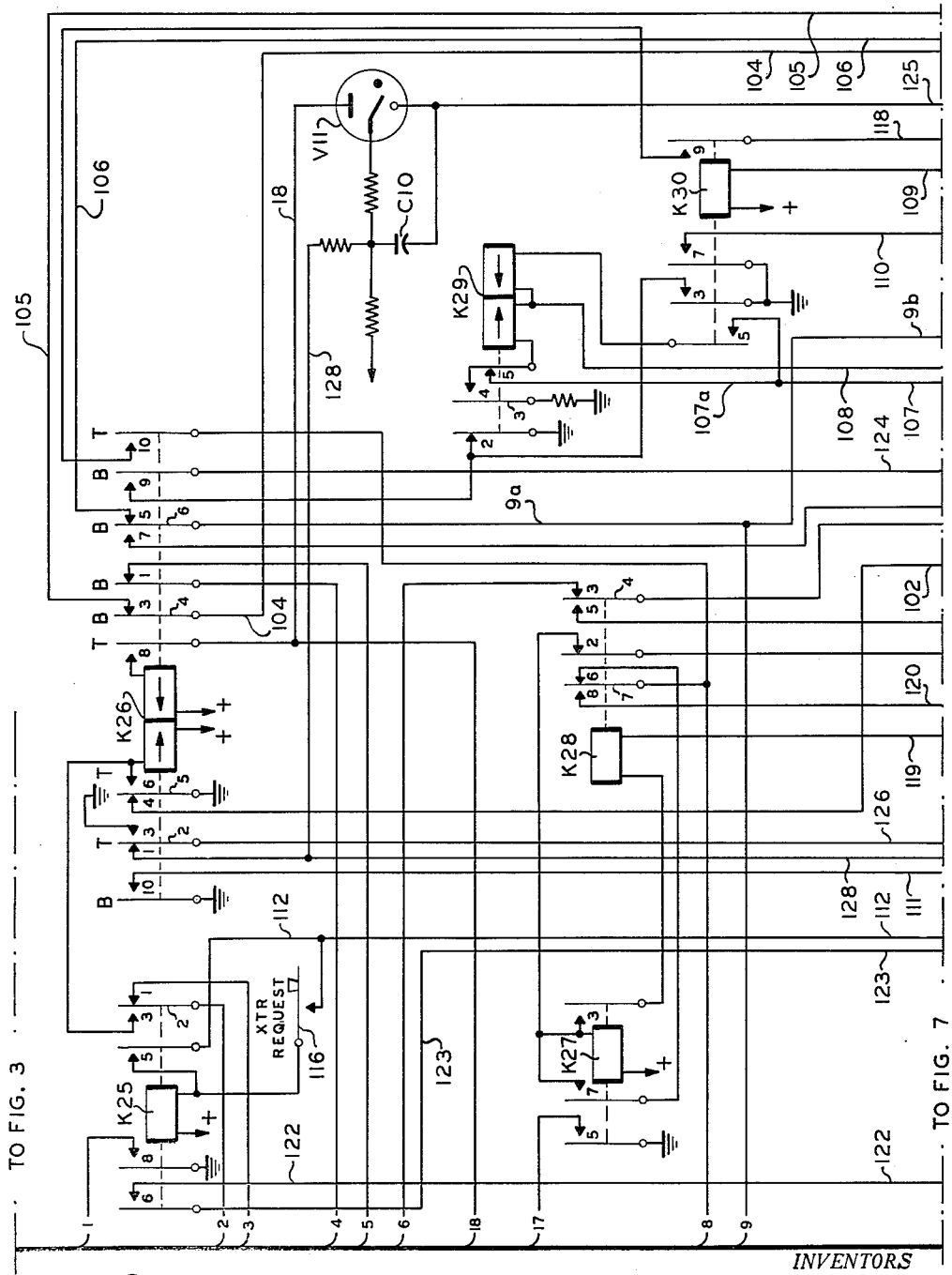
Figure 7:
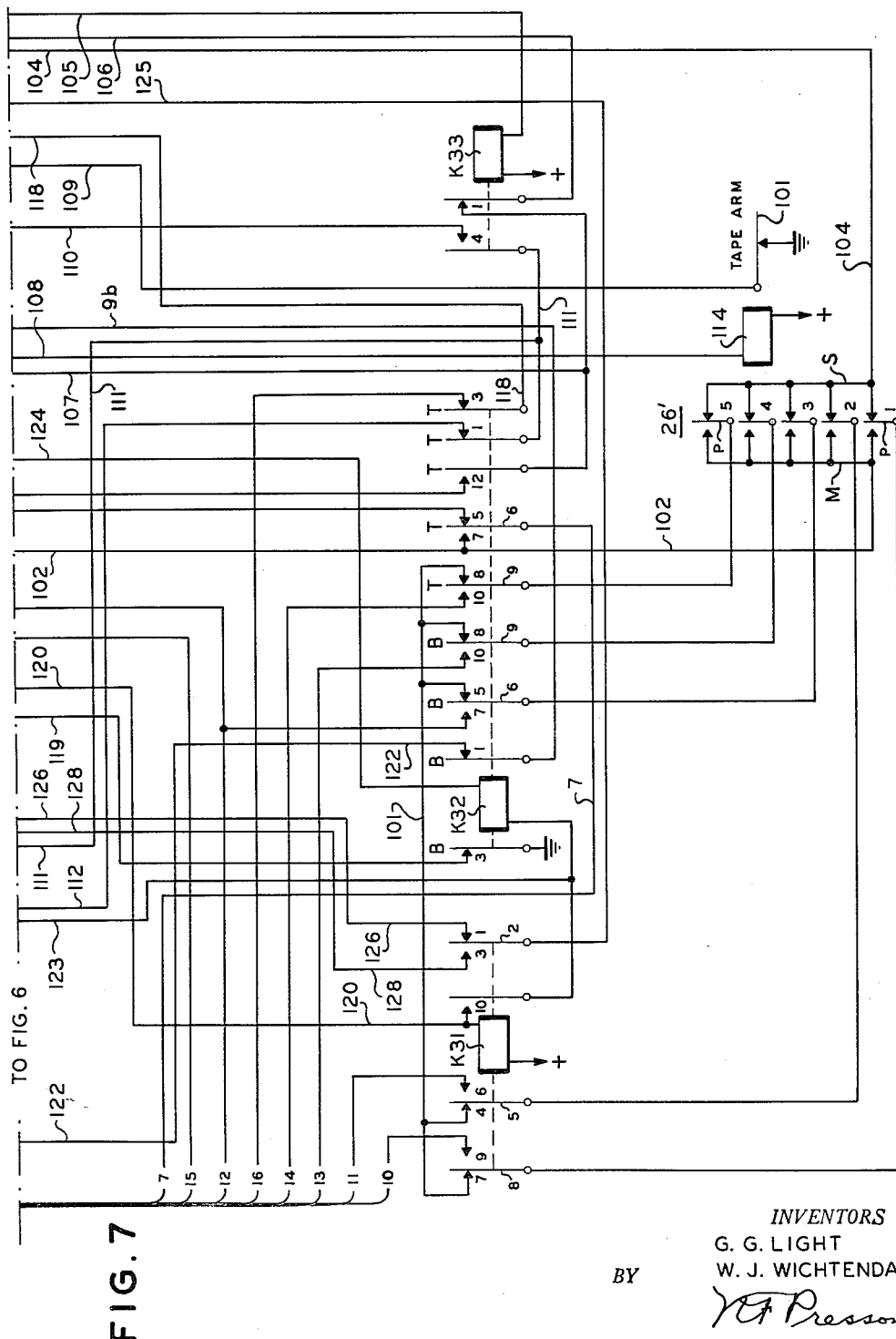

Figs. 6 and 7 show additional circuits which are required when a tape transmitter 26' is employed for transmitting teleprinter traffic from the way station. Links y1, y2 and y3, respectively are inserted between pairs of terminals 2 and 3, 4 and 5, and 6 and 7, when the tape transmitter is not employed; the removal of these links and the connection of the row of terminals 1 to 18 of a cable seen at the bottom of Fig. 3 to a corresponding row of terminals from conductors, Figs. 6 and 7, causes the tape transmitter to be included in the way station circuit.

In the drawings the various control, reading and coding relays are designated by the reference character K followed by a number, and are so referred to in the following description.

*Functions of K12 (Fig. 4).*—Due to the fact that a station may be turned on during a control sequence, it must be prevented from responding to any signals until it is certain that the line L is idle. The start magnet 40, Fig. 5, of the receiving distributor 20' can not be operated by a spacing pulse from the line until K12 is operated by a grid-controlled gas tube V7, Fig. 4, which tube preferably is a thyratron. If the line L stays marking, the grid of V7 is above ground and it conducts after the cathode warm-up time (approximately ten seconds). If the line goes spacing, the grid of V7 is driven negative over a circuit from the tongue of the line relay LR1, solid ring 46 of the distributor 20', conductor 47, armature 5 and contact 4 of K12, and rectifier 49. When the line goes marking, the grid of V7 tends to charge to a positive voltage. If the warm-up time is completed, V7 conducts when its grid reaches ground potential; if the warm-up time is not completed the grid potential continues to rise and V7 conducts when the warm-up time is completed, where upon K12 is operated through V7. When K12 operates it locks up to ground through its contacts 3 thereby shorting out V7, and K12 remains locked up so long as the power is turned on at the station. The operation of K12 closes a path between the tongue of the receiving line relay LR1, solid ring 46 of receiving distributor 20', conductor 47, armature 5 and contact 6 of the relay, conductor 48, segments 42 of the distributor and brush arm 41 to the operate winding of the start magnet 40 to energize the latter and release the distributor brushes for rotation by a constant speed motor through a slip clutch in known manner.

*Character reading circuit.*—The start (spacing) pulse of a received character operates the start magnet 40 of the receiving distributor 20' causing the brushes to make one revolution. The brushes pass over segment 1 during the first pulse of the received character, segment 2 during the second pulse, etc. The segments 1 to 5 are each positioned with respect to the solid ring 46 so that the middle of a signal pulse is received by the segment. The segments 1 to 5 are respectively connected to vacuum tubes V1 to V5 which control character-reading relays K20 to K24. If the first pulse of the received character is marking, V1 conducts, and if it is spacing V1 is cut off, and tubes V2 to V5 operate in a corresponding manner. If V1 conducts, K20 operates. During the second pulse if marking in character K21 is operated; if the third pulse is marking K22 is operated; during the fourth pulse if marking K23 is operated; and during the fifth pulse if marking K24 operates. For example, if the character Y is received, K20, K22 and K24 are operated.

When the brushes pass over segment 6 of the distributor, K11 of Fig. 3 operates through a grid-controlled gas tube V6, such as a thyratron, the operating circuit comprising the winding of K11, conductor 54 segments 52 and 6 of the distributor, conductor 56, energized tube V6, and the grounded armature 2 and contact 1 of K10. K11 has slow release characteristics due to a resistance R5 connected across its winding. The operation of K11 applies ground potential from its armature 2 and contact 3 over conductor 55, armature 4 and contact 3 of K13, Fig. 4, and conductor 58 to probe through the series of contacts of K24, K23, K22, K21 and K20.

If, for example, the character E (first pulse marking) is received, the ground pulse from K11 (probe pulse) finds a path from conductor 58 through armatures and contacts of deenergized K24 to K21 and appears at contact T9 of energized K20: If the character Blank (all pulses spacing) is received, the probe pulse appears at contact T7 of K20. If the control character S (first and third pulses marking) is received, the probe pulse appears at contact B6 of K20. The invitation and selection characters provide outputs on terminals t2 and t4 of the groups of terminals t1 to t4 in circuit with the armatures and contacts of K20 to K24, depending upon the connections of links selectively inserted between these terminals. In the present case, links y5, y6, y7 and y8 are connected to cause the station to respond to its invitation character which is assumed to be the letter B.

*Request and lockout circuits.*—As hereinbefore stated, if no traffic had been received by the central station during an invitation cycle, the control character A subsequently is transmitted by the central station to remove the lockout at the various way stations thereby to permit an open to go to the line if a request button is pushed at one of the stations. Upon receipt of the character A (first and second pulses marking) a lockout relay K10, Fig. 3, is operated over a circuit comprising its right-hand winding, conductor 57, contacts B8 of energized K20 of Fig. 5, contacts 1 of K16, contact T6 and armature 5 of energized K21, and the back contacts T4, T1 and 4 of deenergized K22, K23 and K24, conductor 58, contact 3 and armature 4 of K13, conductor 55, and contact 3 and armature 2 of operated K11 to ground. The operation of K10 at its armature 2 removes ground from the cathode of V6, causing the tube to extinguish since its cathode is then connected to positive battery through a resistance R7 which has substantially the same value as resistance R6 in the plate circuit of the tube.

When it is desired to send from the keyset, a request button 31, Fig. 3, is depressed and applies ground to a circuit including contacts 1 of K6 and the winding of K9, causing K9 to operate. The latter relay locks up over a circuit including its contacts 5 and conductor 74 to level G of the rotary switch RS–1, Fig. 2, and the strapping of the switch points to ground.

Ground from contacts 7 of operated K9 is applied to a circuit including contacts 9 of operated K10 and the winding of K18 to battery; K18 locks up to the contacts 7 of K9. The operation of K18 at its contacts 3 opens conductors 80 and 77 and hence the line L, and also at its contacts 1 opens the circuit of operated K19. The latter relay has slow-to-release characteristics by reason of resistance R9 connected across its winding. After approximately 25 milliseconds K19 releases and at its contacts 1 it recloses the line L. The spacing signal on the line causes a cold cathode tube V10 to conduct, and this causes release of relay K10 by reason of the left-hand winding of the relay which is in opposition to the right-hand winding. The spacing signal also causes the brush arm of receiving distributor 20′ to rotate once.

The opening of the line by two stations almost simultaneously could cause an invalid character to appear on the line. To prevent such a character from being read, K11 cannot operate because tube V6 is not conducting. The circuit to operate K18 is broken at contacts 9 of K10. The release of K10 at its armature 2 and contact 1 again applies ground to the cathode of V6 and the grid of the tube rises exponentially. When its grid reaches ground potential (approximately one-half second after K10 releases) V6 conducts and K11 can operate to provide, at its contacts 3, a probe pulse to read the received characters.

*Handling keyset traffic.*—When its invitation character B is received by the station, the probe pulse appears on armature 2 of K9, Fig. 3, because the character reading relays K20, K23 and K24 were energized in response to receipt of B by the line relay LR1. If the station does not want to transmit (K9 not operated) the probe pulse on its armature 2 operates K6 through a circuit comprising contact 1 of K9, link y1 and the winding of K6. Through its contacts 4, K6 locks up to contacts B1 of K7. A probe pulse from ring 65 of the transmitting distributor 22′ is transmitted over a circuit including armature 2 and contact T1 of K7, contacts 6 of K6 and through the left hand winding of K8, causing the latter relay to operate. At the end of the probe pulse, that is, just as the distributor brush leaves the segment 65, K8 locks up through its contacts 5 and the left hand winding of K7, causing K7 to operate. When K8 operated, a path was closed through its contacts 5, to one end of the left hand winding of K7 but K7 does not operate during the duration of the probe pulse since ground is applied to both ends of its left hand winding. The operation of K7 at its contacts B1 releases K6 and at its contacts B3, K7 opens the short-circuit comprising conductors 77 to 80 across the distributor to allow the invitation character of the next station to be sent.

Switches S1, S2, S3, S4 and S5 are used to set up the character that is to be the invitation character of the next station; those switches which are closed cause marking pulses to be transmitted and those which are open result in spacing pulses transmitted by the distributor 22′. In this case it is assumed that the invitation character of the next station is the letter C, which has the second, third and fourth pulses thereof marking in character, and switches S2, S3 and S4 are correspondingly closed while switches S1 and S5 are open and result in the transmission of the first and fifth pulses as spacing in character. When the brushes of distributor 22′ pass over the start segment S of the segmented ring 60, the line L is opened, sending the start pulse of the character. When the second, third and fourth pulses of the invitation character are marking, as in the present example, the line is closed through the switches S2, S3, S4, and the segments 2, 3 and 4, and the ring 61 of the distributor. The probe pulse generated by segment 65 during this rotation of the distributor, through contacts T2 and T3 of K7 and the right hand winding of K8 causes K8 to release, and by means of the right hand winding of K7, which is an aiding coil, holds K7 operated. At the end of the probe pulse from segment 65 of the distributor, K7 releases. This relay is operated and released at the end of each probe pulse from ring 65 in order to synchronize the breaking and making of the short circuit across the distributor with the distributor rotation.

The signal storage and transmitting elements of the keyset are schematically shown in the transmitting portion 27a of the keyset, Fig. 2. The various details of such a keyset do not comprise a part of the instant invention, and various types of keysets suitable for generating and transmitting signals to the central station are known in the art, and in which the signals are initiated by push buttons, or by a combination of push buttons and a coded selector plate such as disclosed in the U.S. Patent to E. L. Schmidt, No. 2,564,410, issued August 14, 1951. The signals are temporarily stored on contacts such as indicated by the groups 86, 87, 88, 89 in Fig. 2, or in any other buffer storage from which signal characters may successively be transmitted to an outgoing circuit. When the invitation character for the station, such as the character B, is received, the rotary switch RS–1 is stepped, by the received probe pulse from conductor 72, through armature 2 and contact 3 of operated K9, and the link y2 to the first contact of the bank or level A of the rotary switch and through the switch arm of that level and the winding of the stepping magnet to advance the switch one step. The rotary switch is of the type in which the switch arms are simultaneously stepped to the next contacts in their respective levels A to G upon termination of the stepping pulse. The second contact in the switch bank of level B to which the switch was stepped keeps the sending distributor 22′ shorted at that time.

The sending probe pulse from segment 65 of the transmitting distributor over conductor 82 and the strapped wiring of the switch bank contacts of level A at point 2 steps RS–1 to point 3 where the distributor is unshorted on level B. Ground on points 3 of level C and level E operates K1 and K3 thereby connecting the first and third segments of distributor ring 60 to the line. The rotation of the distributor while RS–1 is on point 3 sends the character S (first and third pulses marking) which notifies the central station that keyset traffic is to be sent. The probe pulse from 65 following the character S steps RS–1 to point 4 to send the first information character from the keyset, and this character is represented by the upper horizontal row of contacts 86 to 89 which are permutatively closed depending upon the stored character to be transmitted. If the first, second, third or fourth pulses are to be marking, as determined by the selective closure of contacts 86 to 89 in the first row, K1, K2, K3 or K4 are operated.

In order to provide an "odd parity" check, if an even number of marking pulses are embodied in a keyset character, a path is closed from the line L through level B, point 4, of the rotary switch to armature 2 of K4, and through the contacts of K4, K3, K2 and K1 to armature 2 of K1, and over conductor 90 to segment 5 of the distributor ring 60 to send a marking fifth pulse. If the number of marking pulses is odd, the path through K4, K3, K2 and K1 is not provided and the fifth pulse is sent as spacing.

RS-1 is stepped by the probte pulse sending out characters that are set up on the keyset and the checking relays K1 to K4. When RS-1 steps to the point beyond that of the last character, which in the case illustrated is point 9, the distributor is shorted by conductor 78, the switch arm and strapping on level B of the rotary switch and conductors 79, 80 and 77. At this position of RS-1, bank G, the holding ground for K9 is removed and K9 releases. RS-1 is then self-stepped to point 1 through the remaining points by the strapping on level A of the switch. It will be understood that while the signal buffer storage contacts 86 to 89 comprise only five horizontal rows and hence five characters in the keyset illustrated, many more than these ordinarily will be transmitted, and in this case the additional signal storing contacts or other signal storing elements are connected to additional points on the levels C, D, E and F of the rotary switch. It will also be understood that the wiring of the switch bank points will be multipled in successive arcuate portions of the banks in order that the rotary switch will always stop in the proper position to begin a new cycle of transmission of characters from the keyset.

At the beginning of the keyset message the functional character S is read at each station, providing a probe pulse at contact B6 of K20 and applied to conductor 50 to operate K15, Fig. 4. At the end of the probe pulse K15 locks up through the winding of K13 and contacts 3 of K14 and contact 5 and armature 4 of K15, operating K13. When K13 operates, the path to armature 5 of K24 is broken at contact 3 of K13, thereby preventing message characters from being read as control characters. At its armature 4 and contact 5, K13 transfers the probe pulse to conductor 83 and thence through contacts 1 of K5, Fig. 4, and conductor 67 to the odd parity check circuit shown at the right of K20 to K24, Fig. 5, and to the right hand column of contacts of K20 to K23, but does not affect the keyset because at this time it is not conditioned to receive. At its contact 3 and armature 4 the operated K15 removes the ground from K14 leaving K14 under control of conductor 43 and contacts 44, Fig. 4, which provide ground except when the receiving distributor 20' is in its stop position. Under continuous rotation of the distributor brushes relay K14 does not release because it is made slow-to-release. If the transmission is stopped the distributor remains stopped and K14 releases. At its contacts 3, K14 opens the holding circuit for K13 and K15 allowing them to release. With K13 released, the control characters can be read.

*Receiving reply.*—The functional character S at the beginning of the reply operates K15 and K13 in the manner hereinbefore described. When the next character (which is the first intelligence character of the answerback) is received, the receiving probe pulse is connected through contact B10 and armature 9 of K20 if the first pulse is marking, i.e., K20 is energized; the probe pulse is connected through contact T8 and armature 7 of K21 if the second pulse is marking; through contact T8 and armature 7 of K22 if the third pulse is marking; and contact 7 and armature 6 of K23 if the fourth pulse is marking. The conductors 96, 97, 98 and 99 from the armatures above mentioned extend to the Keyset Input 27b and by means of decoding relays the answer-back characters cause energization of selected signal lamps or other signal devices in the keyset in known manner.

K17 provides a means of checking the odd parity of the incoming characters. If an odd number of marking pulses is received, the probe pulse from armature B2 of K20 and contact B10 of the same relay causes current to flow through both coils of K17, and the fluxes created by the two currents cancel each other and K17 does not operate. If an even number of marking pulses is received, the receiving probe pulse does not appear at armature B2 of K20 and current flows through only one coil of K17 causing it to operate and lock up through its make-before-break contacts 6 and 8 and the Error Alarm release button 100. The operation of K17 at its contacts 5 brings up an Error Alarm to signify that an error has been received. The alarm, which may comprise a buzzer or other known signal device is released by pushing the release button 100. At the end of the response, K14 of Fig. 4 releases, releasing K15 and K13.

*Maintenance stop and start.*—When information is to be transmitted for purposes of maintenance, the control character E is sent to disable the reading circuit. Upon receipt of the E, the probe pulse appears at contact T9 of K20, operating K16 which locks up over its contacts 10 to ground. The opening of contacts 1, 3 and 5 of K16 prevents the reading of any character other than the maintenance stop character E or the maintenance restart (Blank). When the Blank is received, the probe pulse from contact T7 of K20 through contacts 8 of K16 causes K16 to release.

*Handling printer traffic.*—If it is desired to transmit teleprinter traffic from the way station, the links or straps y1, y2 and y3 of Fig. 3 are removed, so that their respective pairs of terminals 2 and 3, 4 and 5, and 6 and 7, are operatively in circuit with correspondingly numbered conductors 2 to 7. At the lower lefthand portion of Fig. 3, are shown conductors 1 to 18 connected to a first row I of terminals, with like conductors connected to a second row II of terminals. When the corresponding terminals are connected together by links or straps as indicated by dotted lines, the conductors 1 to 18 lead to a tape transmitter circuit shown in Figs. 6 and 7, the tape transmitter being designated at 26' in the lower righthand portion of Fig. 7. The tape transmitter has associated therewith a Tape Arm 101 which, in known manner, is caused to open its contact to ground whenever a tight tape condition is obtained. The stepping of the tape transmitter is under control of the distributor 22' of Fig. 4 as hereinafter explained.

*Blank and letter shift idling circuit.*—Referring to the tape transmitter 26' of Fig. 7, if the character in the perforated tape at the time over the pins p of the tape transmitter is not Blank (all spacing) or Letter Shift (all marking) one or more pins making contact with the marking bus M and the rest make contact with the spacing bus S. Contacts 4 and 7 of K31, and contacts B5, B8 and T8 of K32, and conductor 101, connect all the pins together; therefore with a character other than Blank or Letter Shift in the tape transmitter the marking bus M is connected to the spacing S. Thus with a character other than Blank or Letter Shift in the transmitter, ground potential through armature 5 and contact T4 of K26, Fig. 6, is applied to a circuit comprising conductor 102, marking bus M, Fig. 7, one or more transmitter pins, spacing bus S, conductor 104, contacts B4 of K26 and conductor 105 to operate K33 of Fig. 7. If the character in the transmitter is Blank or Letter Shift, K33 is not operated, and the step pulse from segment 64 of the transmitting distributor 22 of Fig. 3 is applied to a circuit comprising conductors 9 and 9a, Fig. 6, armature 6 and contact B5 of K26, conductor 106, contacts 1 of K33, Fig. 7, conductor 107, contacts 5 of operated K30 and also conductor 107a, through both coils of K29 and conductor 108 to operate the step magnet 114 of the tape transmitter. When a character other than Blank or Letter Shift is stepped into the transmitter, the path for the step pulse is broken at contacts 1 of energized K33, preventing the transmitter from stepping.

*Transmitter autostop circuit.*—The current for the step magnet 114 flows through make-before-break contacts 4, 5 of K29, and one coil of K29 in parallel with contacts 5 of K30 and the other coil of K29 on each step pulse. Since the fluxes set up by the currents in the two coils of K29 neutralize each other, K29 does not operate. If the tape arm 101 is raised, as by a tight tape condition, K30 releases and current then flows through only one coil of K29 causing it to operate. K29 locks up through its contacts 3, 5 and the step magnet 114, keeping both K29 and the step magnet energized. On the first step pulse after K30 reoperates, K29 is released by the step pulse through contacts 5 of K30. With K29 deenergized the step magnet releases at the end of the step pulse to step the tape transmitter.

*Sending printer traffic.*—If Blanks and Letter Shifts have been idled through the tape transmitter 26' and the tape arm 101 is down, pushing the transmitter request button 116, Fig. 6, applies ground potential from contacts 7 of energized K30, over conductor 110, contacts 4 of energized K33, conductor 111, contacts T1 of deenergized K32, conductor 112, and the request button 116 to the winding of K25 causing the latter relay to operate. At its contacts 5, K25 locks up to conductor 112 so that releasing the button 116 does not release K25. Ground potential applied by contacts 8 of K25, to a circuit comprising conductor 1 causes operation of K18, Fig. 3, if the lockout is not on, i.e., K10 is operated. When the invitation character B of the station is received, ground potential on link y5 and terminal t4, Fig. 5, is applied by means of conductor 72, armature 2 and contact 1 of K9, conductor 2, and armature 2 and contact 3 of K25, Fig. 6, to operate K26. If the keyset has a message, the ground does not reach conductor 2 but instead is passed through armature 2 and contact 3 of K9 which is then operated, conductor 4 to the contacts B1 of K26, conductor 5 and rotary switch stepping magnet RS–1, Fig. 2, to operate the switch. In this manner the keyset traffic is picked up before the printer traffic. If there is neither keyset nor printer traffic, ground potential is applied to a circut comprising armature 2 and contact 1 of K9, conductor 2, armature 2 and contact 1 of K25, and conductor 3 to operate K6 of Fig. 3. The operation of K6 sends the invitation character of the next station as described hereinbefore.

When K26 operates it locks up to ground through its contact T6 and armature 5. With K26 operated the ground is removed from conductor 102 and the marking bus M, and the connection of conductors 104 and 105 is broken, at contacts B4 of K26, from the spacing bus S to K33. At its contact B10 relay K26 keeps K25 locked up over conductor 111, contacts T1 of K32, and conductor 112. At its contacts B1, K26 opens the path from armature 2 and contact 3 of K9 to the rotary switch RS–1 to prevent the operation of RS–1 in the event that K9 is operated during the probe pulse of the invitation character.

The transmitting probe pulse from segment 65, Fig. 3, of the transmitting distributor 22', over conductor 8, through contacts T10 of K26, contacts 9 of K30, conductor 118, contacts T3 of K32, conductor 16, contacts 1 of K13, Fig. 4, conductor 15, and contacts 2 of K28, causes K27 to operate. At the end of the probe pulse K27 at its contacts 3 locks up in series with K28, and conductor 119 to ground at contacts B3 of K32, causing K28 to operate. If K30 were to release during the duration of the probe pulse this would result in operating K28 prematurely and at its contacts 3, 4 would remove the short from the distributor 22' at the wrong time. In order to prevent this the probe pulse is applied to K27 (when K27 is operated) directly through armature 7 and contact 6 of K28 and contacts 7 of K27. Ground at contacts 5 of K27 and over conductor 17 operates K5, Fig. 4, which locks up through its contact 5 and armature 4. The operation of K28 at its contact 3 and armature 4 breaks the short comprising conductors 6 and 7 across the distributor 22' of Fig. 3, and at its armature 4 and contact 5, K28 connects the line L, by means of conductor 12, to the third segment 3 of the distributor ring 60. This rotation of the distributor sends the control character Space (third pulse marking) which always precedes a printer message and, as hereinafter explained, always precedes the resumption of an interrupted printer message.

The probe pulse from segment 65 of the transmitting distributor, at the end of the Space character, over conductor 8 and through armature 7 and contact 8 of K28 and conductor 120 operates K31. The step pulse from distributor segment 64 and over conductors 9 and 9b through contacts B1 of K32, conductor 122, contacts 6 of K25, and conductor 123 and contacts 10 of K31 keep K31 operated after the probe pulse. After the step pulse, K31 locks up through K32 and conductor 125, contacts B9 of K26, and contacts 2 of K29 to ground, operating K32. The operation of K32 at its contacts B3 releases K27 and K28, and at its contacts T1, K32 releases K25. The line from conductor 7 is tied to the marking bus M through contact T7 and armature 6 of K32, and conductor 102. The various transmitter pins p of the tape transmitter are connected to their respective distributor segments 1 to 5 of ring 60, Fig. 3, over conductors 10 to 14 by K31 and K32. If a pulse is marking, the line is closed through the marking bus M, transmitter pin, distributor segment, distributor brushes 62 and the common distributor ring 61 of the transmitting distributor 22. The first message character is sent. The next step pulse steps the tape transmitter through conductors 9 and 9a, armature B6 and contact B7 of K26, contacts T12 of K32, and both coils of K29.

The character Space is read by the station and operates K13 and K15 of Fig. 4 in the manner hereinbefore described; the operation of K13 prevents the message character from being read as a control character. With K5 operated the receiving probe pulse cannot operate K17, Fig. 5, because the path 67 is broken at contacts 1 of K5. The operation of K15 at its contacts 1 removes a holding ground over conductor 84 from the printer 25. If the line L is marking, a vacuum tube V9 is conducting and if the line is spacing, V9 is cut off. In this manner the message is copied by the teleprinter 25'. With either K15 or K5 unoperated, the printer is held in a constant marking state regardless of the condition of tube V9.

If the tape arm 101, Fig. 7, is lifted due to a tight tape condition the transmitter is auto-stopped, and K30 releases and at its contacts 5 enables K29 to operate on the next step pulse. With K30 released and K29 operated, K31 and K32 release. The release of K32 prevents the step pulse from knocking down K29 when K30 is reoperated. With K32 released the line is again shorted by conductors 6 and 7, at contact T5 and armature T6 of K32. Because transmission is stopped, K13, K14 and K15 of Fig. 4 release, and at its contacts 1, K15 again applies a holding ground over conductor 84 to the printer 25'. When the tape arm 101, Fig. 7, is dropped, K30 operates and with K30 operated and K13, Fig. 4, released, the probe pulse operates K27 and K28 as described above. The operation of K28, which occurs at the end of the probe pulse following the operation of K30, causes the character Space to be sent automatically prior to resumption of transmission of the message characters by the tape transmitter. K31 and K32 operate as described above except that K32 operates at the end of the probe pulse because the path for the step pulse is broken at contacts 6 of K25. The operation of K32 allows the step pulse to release K29 thus stepping the tape transmitter, and the transmitter is not allowed to restart until the tape lever 101 is down and the reading circuit restored.

When the character Space is read at the station, the probe pulse applies ground over conductor 51 to the cathode of tube V8 of Fig. 4 and also at the trigger of the tube from conductor 66 and contact B4 of K20, Fig. 5. If the character received is not Space, the ground appears on the cathode but not the trigger of V8 causing V8 to conduct, and the conduction of V8 causes release of K5 and over conductor 18 causes the release of K26 of Fig. 6. With K5 released the printer 25' is unable to respond to line signals. With K26 released the tape transmitter 26' is unable to start because the operating circuit for K27 is open at contacts T10 of K26.

When the transmitter is auto-stopped as aforesaid (K30 and K31 released), ground potential from armature T2 and contact T3 of K26 is applied over conductor 126, contact 1 and armature 2 of K31, and conductor 125 to the cathode of a cold cathode tube V11 and one side of its timing capacitor C10. A short 128 across the capacitor C10 is removed at contact 3 and armature 2 of K31, and the capacitor charges. If the tape transmitter is started, the timing capacitor is discharged through armature 2 and contact 3 of K31. If the transmitter is not started for a predetermined period, for example, twenty seconds, the potential across the capacitor reaches the trigger voltage of tube V11 causing it to conduct. The conduction of V11, over conductor 18, deenergizes K26 and K5, Fig. 4. K26 at its contact T3 and armature 2 removes the ground, and shorts the capacitor at contact T1 and armature 2 of K26. The station then has to reset the tape containing the message, depress the transmitter request button 116, and wait to be reinvited.

The end-of-message signal is upper case H. The reception of upper case H activates a contact 76 on the monitor printer 25', Fig. 4, and closing of the contact causes release of K5, and over conductor 18 releases K26, Fig. 6. Upon releasing, K5 applies the holding ground to the monitor printer. At its contacts B9, K26 opens the holding circuit releasing K31 and K32. The release of K32 prevents the probe pulse from stepping the transmitter 26' and shorts the distributor 22'.

*Receiving printer traffic.*—When printer traffic is to be sent from the terminal station to a way station, the reception of its printer selection character (assume this to be G) causes the receiving probe pulse to appear at terminal *t2*, Fig. 5, and the ground potential at this terminal operates K5 over conductor 53, and K5 locks up. The next character received is Space which operates K13 and K15, and with these relays operated the circuit cannot read the subsequent message characters as control characters, and the printer 25' responds to line signals. With K5 operated the receiving probe pulse cannot operate K17 of Fig. 5 because the path over conductor 67 is opened at contacts 1 to K5.

Upon receipt of upper case H the printer 25' is cut out as described above. If the transmission is stopped it must be preceded by Space before it can be resumed, as hereinbefore described. Reception of a character other than Space after the transmission has stopped, cuts out the printer as stated hereinbefore.

*Main station operation*

Figure 9:
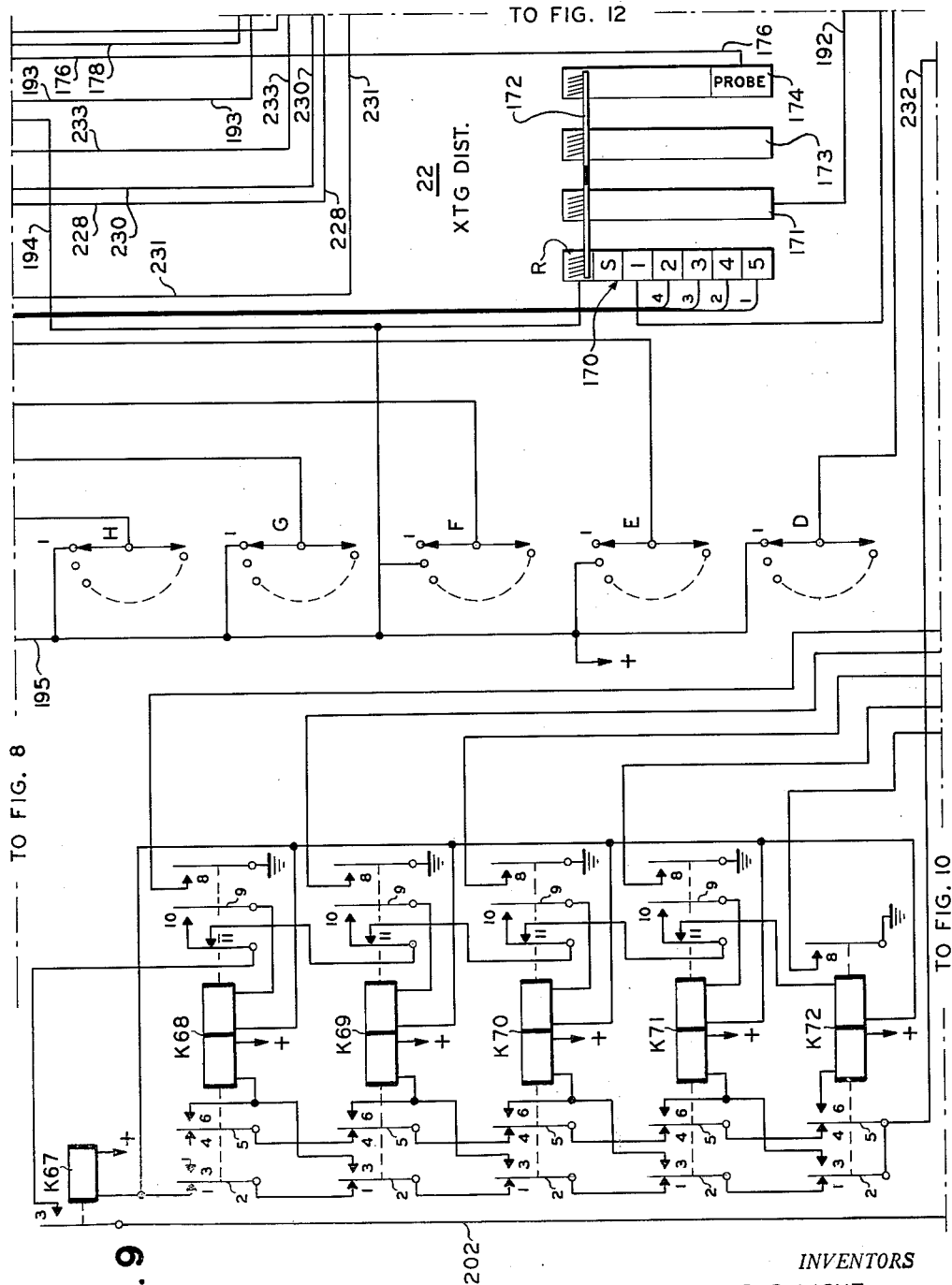
Figure 10:
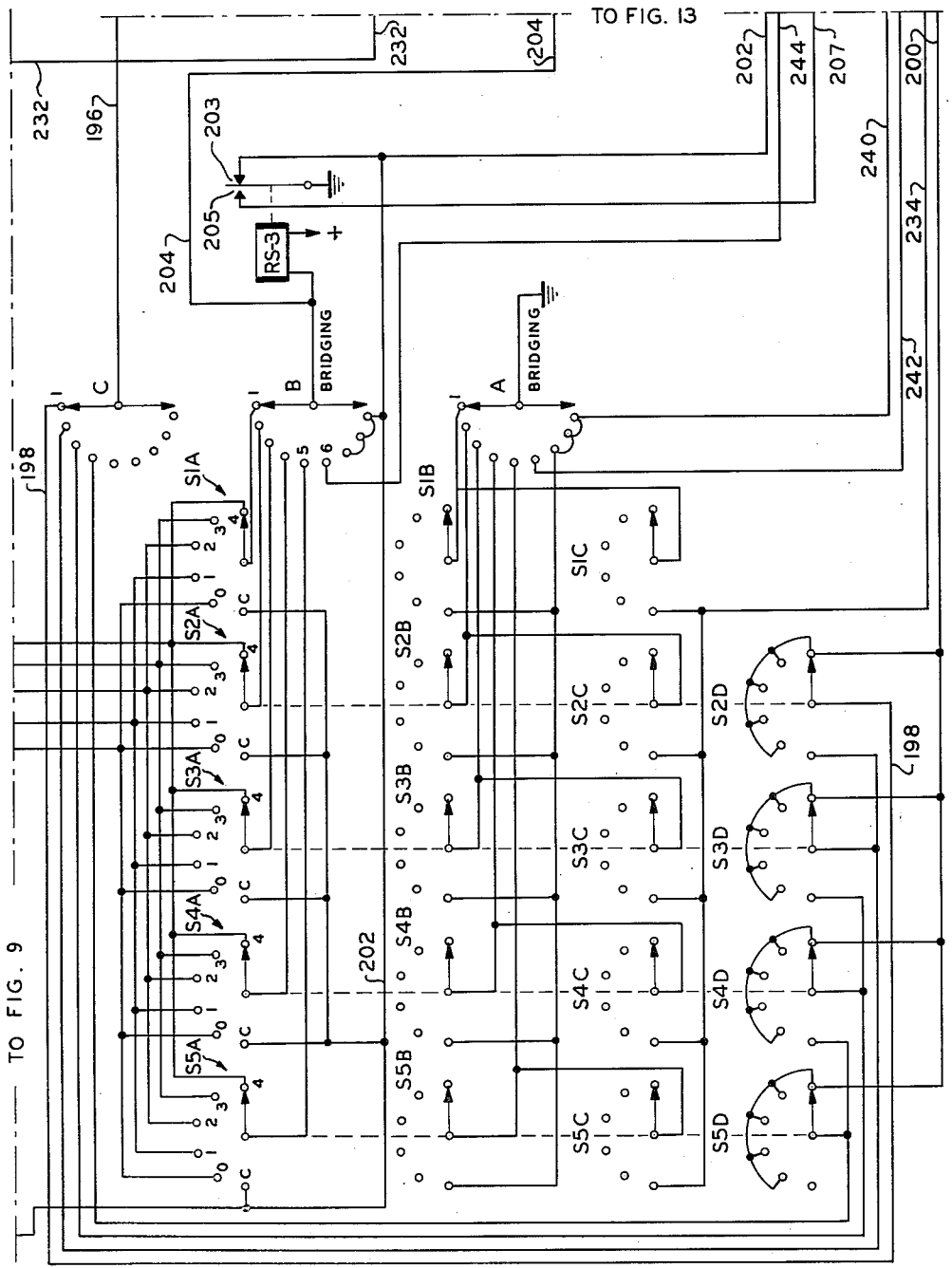
Figure 11:
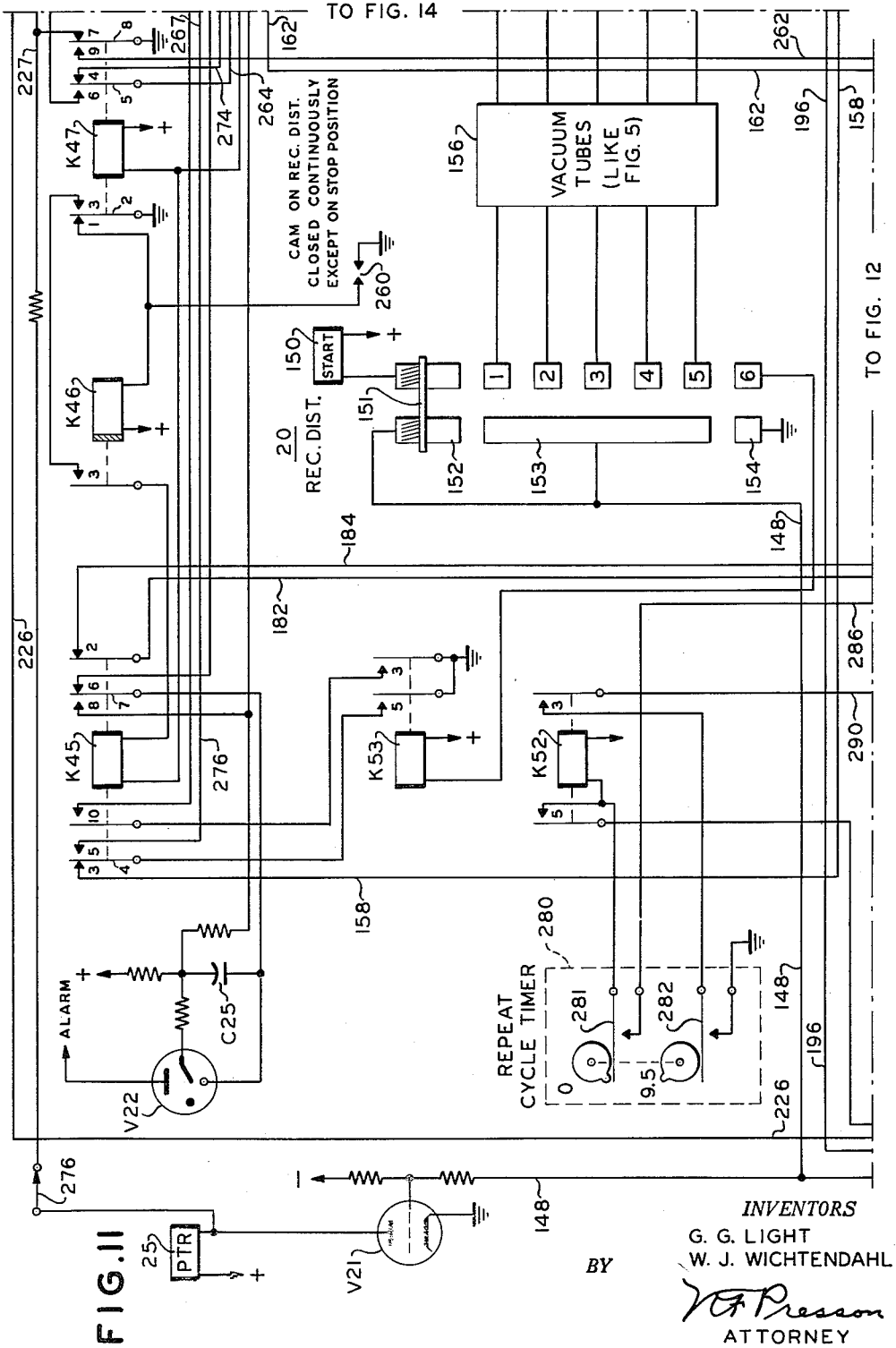

Figs. 8 to 16 collectively comprise the circuit diagram of the apparatus at the main, or terminal, station. The line L is seen in Fig. 11, and at LR2 is shown a well known line relay arrangement in which when sending from the terminal station to the way stations, the outgoing signals over the Send Leg are applied to the apex of the coils of the line relay, one of which coils is connected to an artificial line AL and the other of which is connected to the line L, so that the fluxes in the coils neutralize each other and the armature or tongue or the relay is not affected by the outgoing signals. On incoming signals the coils of the relay are series and the tongue of the relay responds to cause marking and spacing pulses to be applied to the Receiving Leg.

*Character reading circuit.*—If K62, Fig. 11, is operated, the start pulse of a character received over line L operates the start magnet 150, Fig. 14, of the receiving distributor 20, causing the brushes on brush arm 151 to make one revolution, the circuit comprising the Receiving Leg, Fig. 11, armature 4 and contact 5 of energized K22, conductor 148, rest segments 152 of the distributor 20 and the start magnet 150 to positive battery. The segments 1 to 5 of the distributor are connected to vacuum tube circuits indicated by the rectangle 156, which circuits are like those shown in Fig. 5 hereinbefore described, the vacuum tube circuits controlling the five character reading relays K55 to K59 of Fig. 14. The function of K62 is explained in detail hereinafter. In the same manner as hereinbefore described for the way station, K55 of the group of character reading relays, Fig. 14, is operated if the first pulse is marking; K56 is operated if the second pulse is marking; K57 is operated if the third pulse is marking; K58 is operated if the fourth pulse is marking; and K59 is operated if the fifth pulse is marking. These relays are not operated if their respective pulses are spacing. For example, if the character Y (first, third and fifth pulses marking) is received, K55, K57 and K59 are operated. When the brushes pass over segments 6 and 154 of the distributor, Fig. 11, K53 operates and applies a ground pulse through its contacts 5, armature 4 and contact 3 of K45, and conductor 158 to armature 2 of K59, Fig. 14, to probe through the contacts of K55 to K59.

If the character Space (third pulse marking) is received, the ground pulse from K53 (probe pulse) appears at contact T3 of K55. If the character S (first and third pulses marking) is received, the probe pulse appears at contact T5 of K55. If the character Line Feed (second pulse marking) is received, the probe pulse appears at contact T1 of K55. If the character E (first pulse marking) is received, the probe pulse appears at contact T8 of K55. If the character Blank (all pulses spacing) is received, the probe pulse appears at contact T6 of K55. If a character other than Space, S, Line Feed, E and Blank is received, the probe pulse appears at K56, contact T3.

Figure 12:
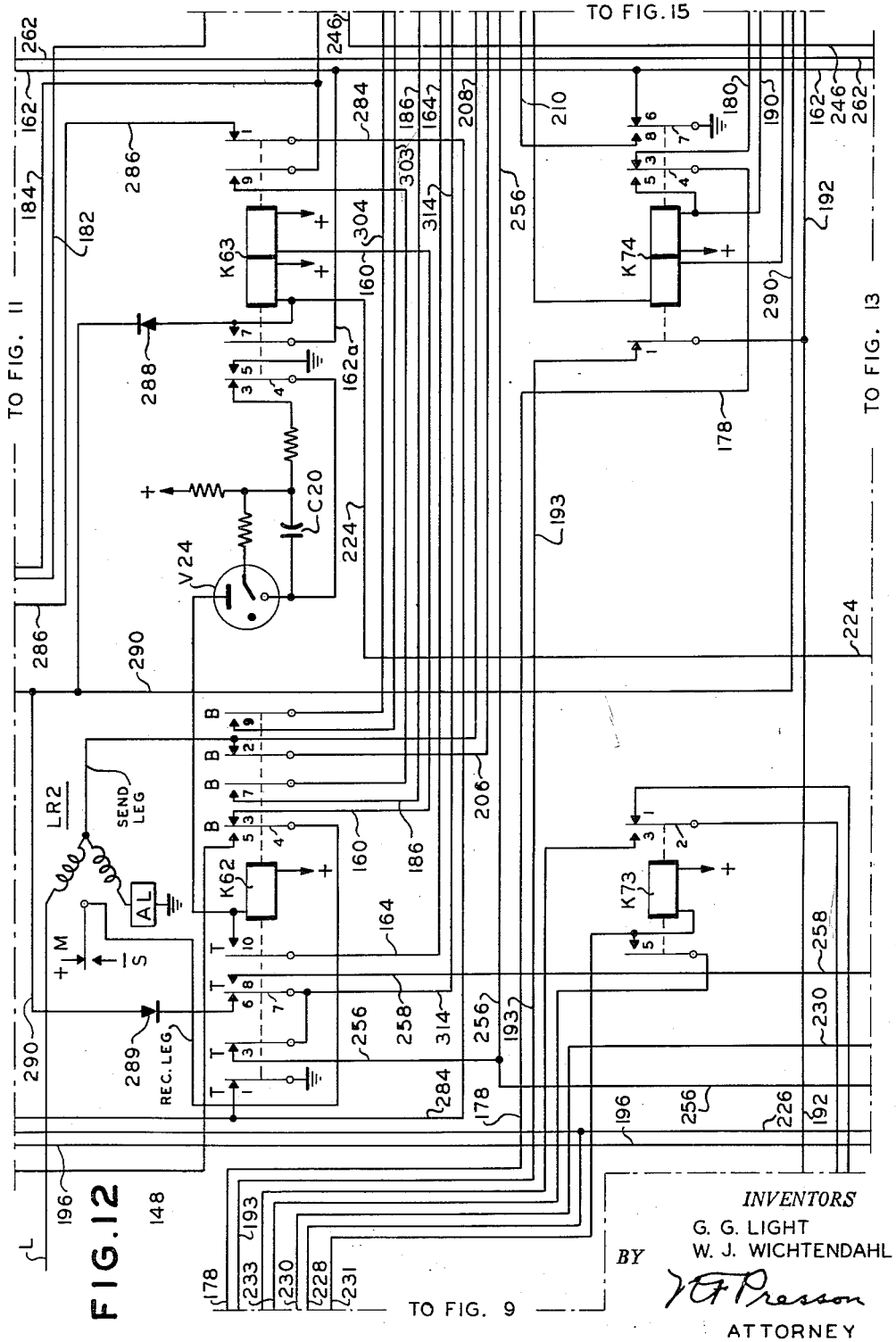

*Inviting the way stations to send.*—When the request signal (25 milliseconds open) is received, the negative battery on the spacing contact of the line relay LR2, Fig. 11, through the receiving leg, contacts 3 and 4 of K62 (which is deenergized at this time) and conductor 160 and the righthand winding of K63, causes operation of K63 which locks up through its lefthand winding and contacts 7, over conductors 162a and 162 to ground at contact 6 and armature 7 of K74, Fig. 12. The operation of K63 starts the capacitor C20 in the trigger anode of a gas tube V24 charging towards plus battery. After approximately one second the potential across the capacitor reaches the trigger potential of V24 causing it to conduct, and the conduction of this tube operates K62. K62 locks up to ground over conductor 164, extinguishing the tube V24. At its armature 4 and contact 5, K62 connects the tongue of the line relay LR2 to conductor 148 and thence to the start magnet 150 of the receiving distributor 20.

Figure 8:
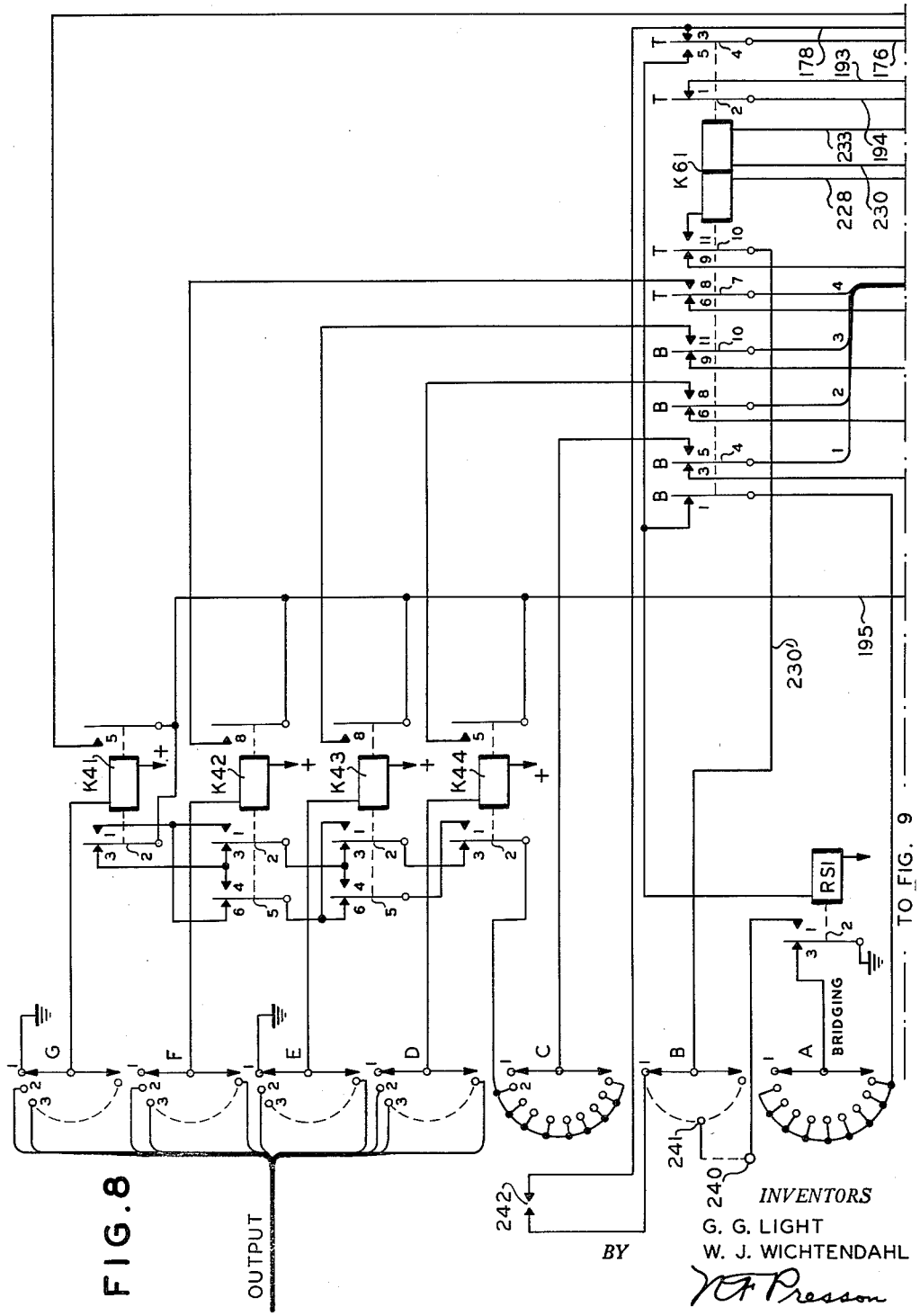

The probe pulse from segment 174 of transmitting distributor 22 of Fig. 9, is applied to a circuit comprising conductor 176, armature T4 and contact 3 of K61, Fig. 8, conductor 178, armature 4 and contact 3 of K74, Fig. 12, conductor 180, contacts 1 of K66 of Fig. 15, conductor 182, contacts 2 of K45, Fig. 11, conductor 184, contacts 9 of energized K63, contacts B7 of energized K62, conductor 186, contacts 1 of K65, Fig. 15, conductor 188 and the lefthand winding of K75, causing operation of K75. At the end of the probe pulse K75 locks up through the lefthand winding of K74, Fig. 12, to ground on contact 3 of K75, and operates K74. Opening the contacts 6 and 7 of K74 allows K63 to release because ground potential is thereby removed from conductor 162a. At its contacts 1, operated K74 opens the short which is normally across the transmitting distributor 22, the short comprising conductors 192, 193 and 194. This rotation of the transmitting distributor sends the invitation character for the first way station. The first point of the bank of contacts comprising level D of the rotary switch RS-3 of Figs. 9 and 10 is wired, by means of conductor 195 to battery if the first pulse of the invitation character is to be marking; level E point 1 if the second pulse is to be marking, level F point 1 if the third pulse is to be marking, etc. As the distributor brush arm 172 rotates, the line is closed through the levels D to H of RS-3, contacts of K61, Fig. 8, and K73, Fig. 12, the segments of the distributor, the brushes, common ring 171 of the distributor, conductor 192, contacts 4 of K76, Fig. 15, conductor 206, contacts 4 of K66, and conductor 208 to the sending leg of the line relay LR2 of Fig. 11 if the line is marking. The schematic, Fig. 9, shows the switch banks of RS-3 wired to send the character B (first and second pulses marking). It will be understood that the second points of levels D, E, F, G and H are wired to send the invitation character of the second station, the third points the third station, etc.

The probe pulse, during the rotation of the distributor 22, through armature 4 and contacts T3 of K61, conductor 178, armature 4 and contact 5 of energized K74, conductor 190, contacts 5 of K75 and the righthand winding of K75, causes this relay to release and holds K74 operated. At the end of the probe pulse K74 releases. K74 is operated and released at the end of the probe pulse in order to synchronize the making and breaking of the short across the free running distributor 22 with the distributor rotation.

The invitation character is not seen by the line relay LR2 because the receive leg is independent of the send leg. If the first station has no message to send, it sends the invitation character of the next station as hereinbefore described. This invitation character is other than Spacing, S, Line Feed, E and Blank, and therefore the receiving probe pulse appears at contact T3 of K56, Fig. 14, and ground potential, through contacts 4 of K54, is applied to conductor 196 and bank C of rotary switch RS-3 of Fig. 10 to signify at the terminal station that a character has been received which is other than the five characters above mentioned. This probe pulse at level C point 1 of RS-3, conductor 198 and a switch S2D and conductor 200 operates K81, Fig. 16, which locks up over conductor 202 to the break contact 204 of the rotary switch RS-3. Ground potential through contacts 3 of K81 over conductor 204 operates RS-3, causing K81 to release. When K81 releases, RS-3 steps to point 2.

*Reinvite circuit.*—The switches S1, S2, S3 S4 and S5 shown in the left hand portion of Fig. 10 comprise vertical columns of settable gang switches which are used to determine the number of times that a station is to be invited during an invitation cycle. The system can handle many stations but for purposes of illustration the drawing shows only switches for five stations (indicated by the digits 1, 2, 3, 4 and 5 in the switch designations S1A to S5D) since there are five vertical columns of these ganged switches. The switches have a close-out position C (no times), a 0 reinvite (1 time), a 1 reinvite, a 2 reinvite, a 3 reinvite and a 4 reinvite position. As shown the gang switches are set on the 4 reinvite position for all stations, but each gang switch is independently settable to any of the reinvite positions 0 to 4 of the close-out position C. If station 1, 2, 3 or 4 is invited and all the stations beyond it are closed out, the probe pulse from the character other than Space, S, Line Feed, E and Blank can not operate K81 of Fig. 16 because the path 200 is broken at S2D, S3D, S4D or S5D of Fig. 10. If all the stations are cut in, a character other than the five just mentioned can not operate K81 while the rotary switch RS-3 is on point 5. Since the character other than the five mentioned can not operate K81, it means that the station is the last station in the invitation series and only Line Feed is accepted as a "no message" answer. Upon reception of the Line Feed, the probe pulse from contact T1 of K55, Fig. 14, through contacts 8 of K94 operates K81 over conductor 209.

When K74, Fig. 12, is operated during the invitation character, ground through its armature 7 and contact 8, conductor 210, armature 6 and contact 5 of K64, Fig. 15, conductor 212, contacts 2 of K79, conductor 214, contacts 1 of K85, Fig. 16, operates K80 which locks up through contacts 1 of K85, conductor 214, contacts 2 of K79, conductor 214a, contacts 7 of K80, conductors 216 and 164, and contacts 2 of K64 to ground. The operation of K80, Fig. 16, at its contact 3, starts the capacitor C22 in the trigger circuit of a gas-filled tube V26 charging towards plus battery. Operation of K81, at its contacts 7, applies ground to the capacitor to reset the timing. The receipt of a message releases K80 which resets the timing as described below. In this manner the capacitor continues to charge only if the "no message" answer is not received. When V26 conducts, it operates K82, and at its armature 2 and contact 3, K82 operates the rotary switch RS-3 over conductor 204. Ground from the make contact 205 of RS-3, over conductor 207, through contacts 5 of K82, Fig. 16, operates K85 which locks up through its contacts 4 and conductors 218 and 220 to contact 1 and armature 2 of K75. The operation of K85 releases K80 which extinguishes tube V26, allowing K82 to release. The release of K82 allows rotary switch RS-3 to step to the next point. Ground through armature 2 and contact 1 of K82 and contacts 6 of K85 and conductors 222 and 224 operates K63, Fig. 11. The operation of K63 initiates the transmission of the next invitation character to be sent as described above.

The reception of a Keyset message or a printer message is described below.

At the end of a reply message obtained from the Computer or other data processing equipment at the terminal station, or at the end of a printer message received from a way station, K78 is operated, in a manner described below. At its contacts 5, K78 applies ground to conductor 224 and operates K63, Fig. 11, to initiate the transmission of the next invitation character. Also K78 at its armature 2 and contact 3 applies ground potential to conductor 232, through armatures 2 and contacts 1 of K72, K71, K70, K69 and K68, Fig. 9, and operates K67. When K78 releases, K67 locks up in series with K72, through the make-before-break contacts 10 and 11 of K71 to K68, contacts 3 of K67, and conductor 202 and break contact 203 of RS-3 to ground, operating K72.

If the message is from a station $n$ and that station is to be invited only once in each invitation cycle, ground potential from armature 7 and contact 8 of K72 is applied to the 0 position of one of the switches S1A to S5A corresponding to the $n$ station, through the arm of the switch and one of the contacts of level B of RS-3 and through the stepping coil of RS-3 to battery, to operate RS-3. The opening of the break contact 203 of RS-3 releases K67 and K72, and the release of K72 allows RS-3 to step to the next point. If the station is to be invited more than once in an invitation cycle, after the next reply back K78 of Fig. 13 again operates, and K71 is operated and at its armature 7 and contact 8 applies ground potential to contact 1 position of the switches S1A to S5A, with K72 releasing when K78 releases. Thus if the station is to be invited twice, RS-3 is operated by armature 7 and contact 8 of K71. RS-3 upon operating releases K67 and K71. If the station is to be operated more than twice, the next time K78 operates, K70 is operated with K71 releasing when K78 releases. In the same manner the station can be invited up to five times successively, depending upon the setting of switches S1A to S5A.

Figure 13:
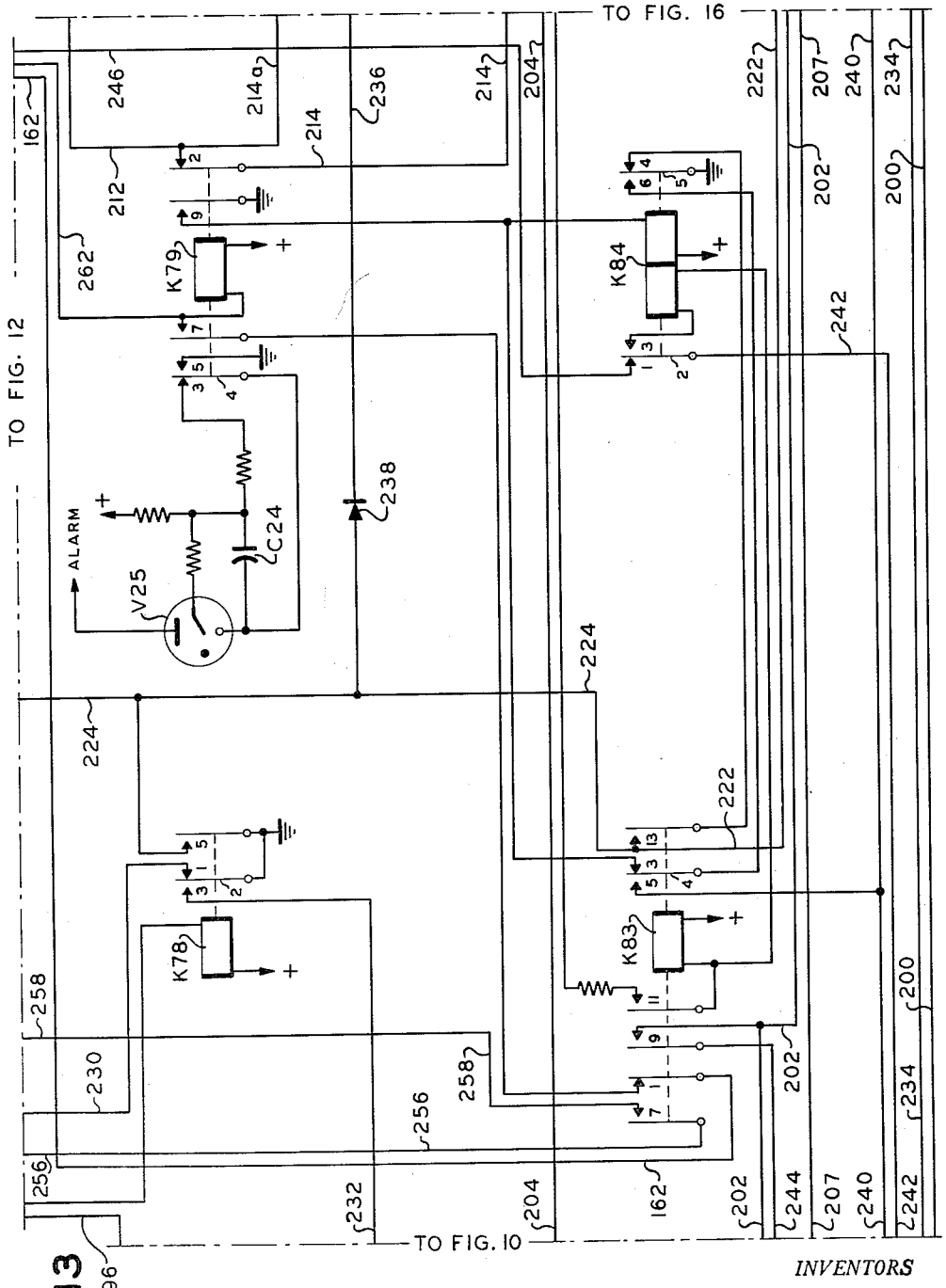

When a "no message" answer is received (which is a character other than Space, S, Line Feed, E and Blank) and RS-3 is stepped to a point that is closed out, ground potential is applied through RS-3, level A, close-out position level C of the switch banks S1C to S5C of the manually settable switches, over conductor 234, contacts 5 of operated K89, Fig. 16, conductor 236, rectifier 238, Fig. 13, conductor 224, and the left hand winding of K63, Fig. 11, and operates K63 to initiate the sending of the next invitation character in a manner hereinbefore described. Thus, if a station is invited that is closed out, the next station in the invitation series is invited without waiting for tube V26 of Fig. 16 to fire. K65 of Fig. 15 is operated over conductor 240 and one of the switches S1B to S5B and level A of RS–3. The operation of K65 at its contacts 1 prevents K75 from operating until RS–3 has stepped from the point corresponding to the closed out station. K65 is operated every time RS–3 comes to a closed out station to prevent the character from being started until RS–3 self-steps from that point.

When a message is received by the terminal station, K84 of Fig. 13 is operated as follows: When RS–3 steps to the point (6) beyond that corresponding to the last station, ground potential from that point on level A of RS–3 is applied to conductor 242, through armature 2 and contact 3 and the left hand winding of K84, Fig. 13, and operates K83. At its armature 4 and contact 3, K83 opens the holding circuit for K84 but it remains locked up through K83. Ground potential applied through armature 5 and contact 6 of K84 and armature 4 and contact 5 of K83 operates K65, Fig. 15, over conductor 240, which prevents the next character from being sent. Ground potential from the break contact 203 of RS–3, over conductor 242 and contacts 9 of K83 and conductor 244 and level B of RS–3, self-steps RS–3. When RS–3 steps from the point, K84 releases, and the ground potential from its armature 5 and contact 4, and through contacts 13 of K83 and conductor 224, operates K63, Fig. 11. RS–3 self-steps to point 1 through the bridged contacts on level B of the switch. The bridged contacts on level A keep K65, Fig. 15, operated over conductor 240. When RS–3 reaches point 1, K65 releases and the character to invite the first station is sent. When K75 operates, ground is removed from conductor 220, and K83 releases.

If no messages were received during the invitation cycle, K84 of Fig. 13 is not operated. When RS–3 steps to the point beyond that corresponding to the last station, ground potential from that point on RS–3, level A, through conductor 242, armature 2 and contact 1 of K84 and conductor 246 operates K64 of Fig. 15. At its contacts 2, operated K64 releases K62, Fig. 11. The probe pulse from segment 174 of the transmitting distributor 22, over conductor 176, armature 4 and contact T3 of K61, conductor 178, armature 3 and contact 4 of K74, conductor 180, contacts 1 of K66, Fig. 15, conductor 182, contacts 2 of K45, Fig. 11, conductor 184 and contacts 9 of K64, Fig. 15, and conductor 188, operates K75. At the end of the probe pulse K75 locks up through the right hand winding of K74, Fig. 12, operating K74. Ground potential applied from armature 7 of contact 8 of K74, conductor 210 and contacts 7 of K64, and conductors 248 and 204, operates RS–3. Levels D, E, F, G and H, Fig. 9, of the rotary switch are wired so that during this revolution of the distributor 22 it sends the character A to remove the lockout from the way stations. The end of the probe pulse following the character A allows K74, Fig. 12, to release. The release of K74 allows RS–3 to step, releasing K64 of Fig. 15. RS–3 then self-steps to point 1.

*Receiving keyset traffic.*—If a station has keyset traffic to send, it sends the character S in response to its invitation, as hereinbefore stated. When the S is read by the character reading relays K55 to K59, Fig. 14, the receiving probe pulse from ground at contacts of K53 and over conductor 158 appears at contact T5 of K55 to operate K47, Fig. 11. At the end of the pulse K47 locks up through K45, contacts 3 of K46 and contact 3 and armature 2 of K47 to operate K45. When K45 operates, the path to armature 2 of K59, Fig. 14, is broken at contact 3 and armature 4 of K45, Fig. 11, thereby preventing the message characters from being read as control characters. K45 at its armature 4 and contact 5, conductor 267, through armature 5 and contact T4 of K48, Fig. 14, transfers the probe pulse to the odd check circuit of the character reading relays K55 to K59 and to the make contacts B10 and B8 of the character reading relays. The associated armatures are connected to input conductors 250 to 253 of the computer or other data processing equipment. At its contact 1 and armature 2, K47 removes ground from K46, leaving K46 under control of a cam-controlled contact 260, Fig. 11, which provides ground except when the receiving distributor 20 is at the stop position. Under continuous rotation of the distributor, K46 does not release because it is slow to release. Ground potential from armature 8 and contact 9 of K47 operates K79, Fig. 13, over conductor 262.

K79 locks up through its contacts 7, K83, contacts 1 and conductor 162 to contact 6 and the grounded armature 7 of K74, Fig. 12. K79 at its contacts 2 opens the holding circuit over conductor 214 and contacts 1 of K85, Fig. 16, for K80, releasing K80. K79, at its contacts 9, operates K84 which indicates that at least one way station has sent a message during the invitation cycle. The operation of K79 starts the capacitor C24 in the trigger circuit of gas tube V25 charging to plus battery. When the answer is finished, the next character is sent. K79 releases when K74 operates. If the answer is not sent K79 is not released and tube V25 fires and brings up an alarm signifying that the reply is late.

When the first message character is received, the receiving probe pulse from segments 154 and 6 of the distributor 20, Fig. 11, causes operation of K53 and at its contacts 5 the relay applies a probe pulse through armature 4 and contact 5 of K45. If the first pulse is marking it is applied through B10 of K55, Fig. 14. If the second pulse is marking it is applied through B10 of K56. If the third pulse is marking it is applied through B8 of K57. If the fourth pulse is marking it is applied through B8 of K58. The marking pulses apply ground to conductors 250, 251, 252 and 253 and levels E, D, C and B of rotary switch RS–2 of Fig. 14, and thence into the computer. The probe pulse from contacts 3 of K53, Fig. 11, through contacts 10 of K45, contacts T2 of K48, Fig. 14, and armature 5 and contact 6 of K47, over conductor 264, steps RS–2. The marking pulses of the second character deliver a pulse through the second points of the levels of RS–2. The following characters are distributed to the remaining points of RS–2 in similar manner.

K60 of Fig. 15 provides a means of checking the odd parity of the incoming characters. If an odd number of marking pulses are received, the probe pulse over conductor 268 to K59, armature 8, and K58, contact B8, causes current to flow in both coils of K60, and since the fluxes created by the two currents cancel each other, K60 does not operate. If an even number of marking pulses is received, the receiving probe pulse does not appear at armature 8 of K59 and current flows through only one coil of K60, operating K60. The operating circuits are broken at contact 1 of K60 and contacts 6, 7 of K60 with the relay locking up through its armature 5 and contact 7 and a push button 270. An error alarm is thus set up by K60. Operation of the push button 270 releases K60.

At the end of the incoming keyset message the distributor 20 stops, allowing K46 to release because cam-controlled contacts 260 on the distributor are opened, these contacts being closed continuously except on the stop position of the distributor. The release of K46 releases K45 and K47. Ground potential from the bridged points of level A of RS–2 and the interrupter spring 272, conductor 274, contacts 4, 5 of K47, and conductor 264 and the coil of RS–2 self-steps the switch to point 1.

When the answer is ready, the transmitting probe pulse from segment 174 of distributor 22, Fig. 9, through contacts T3 and 4 of K61, contacts 292 associated with point 1 of bank B of rotary switch RS–1, Fig. 8, conductor 230, contacts 9 and 10 of K61, and conductor 231, operates K73, Fig. 12. At the end of the probe pulse K73 locks up through its contacts 5, conductor 233, righthand winding of K61, conductor 230 and contact 1 and armature 2 of K78, operating K61. K61 at its contacts T2, opens the short comprising conductors 193—194 across the distributor 22. The operation of K61 and K73, Fig. 12, connects the 1, 2, 3 and 4 segments, respectively, of the distributor to the right hand make contacts of K41, K42, K43 and K44 of Fig. 8. Ground from point 1, levels G and E, of RS–1 operates K41 and K43. With K41 and K43 operated this rotation of the distributor 22 sends the character S (first and third pulses marking). The probe pulse through K61, contacts T4 and 5, steps RS–1 to point 2 at the end of the character S. While RS–1 is on point 2, the first information character from the reply is sent. If the first, second, third or fourth pulses are to be marking, K41, K42, K43 or K44 are operated.

In order to provide an odd parity check, if the number of pulses to be sent is even, a path is closed from the fifth segment 5 of ring 170, through contacts B4 and 5 of K 61, switch RS–1, level C, point 2, to K44, armature 2, through the lefthand contacts of K44, K43, K42 and K41 to armature 2 of K41 and thence over conductor 195 to send a fifth marking pulse. If the number of marking pulses is odd, the path through the lefthand contacts of K44 to K41 is not provided and the fifth pulse is sent as spacing.

RS–1 is stepped by the probe pulse sending out characters that are set up by the computer reply and checking relays K41 to K44. When RS–1 is on a point 241 corresponding to the last character of the reply, ground potential is applied from armature 2 and contact 1 of RS–1, terminal 240, point 241 of level B of the switch, conductor 230', contacts T10 and 11 of K61, and the lefthand winding of K61 and conductors 228 and 226, and operates K78 of Fig. 13. The operation of K78 removes ground from its contact 1 and releases K73, Fig. 12, but K61 is held operated by the probe pulse through its left hand coil. The function of K78 has been described hereinbefore. At the end of the probe pulse, K61 and K78 release. The release of K61 reshorts the distributor at contacts T2 of K61. Ground through the break contact 3 of RS–1, level A, and contacts B1 of K61 allows RS–1 to self-step to point 1.

*Receiving printer traffic.*—If a way station has printer traffic to send, it sends the character Space in response to its invitation. When the Space is read the receiving probe pulse appears at contact T3 of K55 of Fig. 14 to operate K47, Fig. 11, and K48, Fig. 14. K45, K46, Fig. 11, and K79, Fig. 13, operate as hereinbefore described for keyset traffic. With K48 operated the receiving probe pulse can not step RS–2 of Fig. 14, or go to the computer and parity check circuit because the circuits are broken at K48, contacts T2 and T4. The probe pulse through K48, armature T5 and contact 6, to K59, armature 5, appears at contacts B8 of K55 if the character Figure Shift (first, second, fourth and fifth pulses marking) is received; at contact B1 of K55 if the character H (third and fifth pulses marking) is received; and at contact B3 of K55 if any character other than H is received.

With K47 and K48 operated, the holding ground over conductor 277 and switch 276 is removed from the printer 25, Fig. 11. If the line is marking, vacuum tube V21 is conducting, and if the line is spacing the tube is cut off. In this manner the message is copied by the receiving printer. If the switch 276 is opened, thereby removing the holding ground from the printer, the printer will act as a monitor to copy all incoming traffic, whether keyset or teleprinter messages.

If transmission ceases, K45, K46 and K47 release, and with K47 released the holding ground over conductor 277 is again applied to the printer. If the transmission is resumed, it is preceded by Space which operates K45 and K47 again and the printer responds to line signals. When the transmission stops (K45 unoperated and K48 operated), ground is applied to the cathode of the cold cathode gas tube V22, Fig. 11, through contacts 6 and 7 of K45 and contacts B4 and 5 of K48. The capacitor C25 in the trigger of V22 starts to charge to plus battery because the short across the condenser is removed at contacts 7 and 8 of K45. After transmission is resumed, the ground is removed at contacts 6 and 7 of K45 and the capacitor discharges through contacts 7 and 8 of K45. If the capacitor is allowed to charge to the trigger potential of V22 the tube conducts. The conduction of V22 brings on an alarm showing that transmission has been stopped without an end-of-message character (Figure Shift H).

On printer traffic the terminal station does not send a reply, so that K61 of Fig. 8 is not operated. Printer traffic always ends with upper case H. If the Figure Shift character is received, the probe pulse appears at contact B8 of K55, Fig. 14, and operates K49, and through contacts 3 of K49 applies ground potential to one end of the lefthand winding of K50 which prevents K50 from operating during the duration of the probe pulse. At the end of the probe pulse K49 locks up through K50, contacts 1 and 2 of K51, and contacts B7 of K48, operating K50. When the character H is received, the probe pulse appears at contact B1 of K55, Fig. 14, and through contacts 7 of K50 operates K51. The operation of K51 releases K49, but the operating current for K51 keeps K50 operated. At the end of the pulse K50 releases and K51 locks up through its contacts 2 and 3 and contacts B7 of K48. If the character after the Figure Shift is not H, the probe pulse from contact B3 of K55, through contacts 5 of K50 and contacts 5 of K49 knocks K49 down, causing K50 to release.

When K50 operates, ground through its contacts 3 and contacts 8 of K51 and conductor 226 operates K78 of Fig. 13. K78 then functions as described hereinbefore to see if the station is to be reinvited, the operation of K78 causing K63 of Fig. 11 to operate. After the transmission is stopped, K45 releases and the transmitting probe pulse operates K75, Fig. 15, and K74, Fig. 12, to send the next invitation character. The operation of K74 releases K48 which releases K51. When K51 was operated, the capacitor C26 in the trigger of the gas tube V23 of Fig. 14 was allowed to charge towards plus battery. If the transmission does not cease after reception of Figure Shift H, i.e., K51 remains operated, tube V23 fires. The firing of the tube brings up an alarm to show that the end-of-message signal has been received but that transmission did not cease.

*Transmitting printer traffic.*—Printer traffic is transmitted from the terminal station by means of a well-known type of tape transmitting distributor unit 26, Fig. 15, the transmitter contacts being connected to contacts 1 to 5 of the associated distributor. Such a unit preferably, although not necessarily, is a Model 14 transmitting distributor manufactured by the Teletype Corporation of Chicago, Illinois, or is a distributor transmitter such as disclosed in the U.S. patent to Rothermel, No. 1,805,374, issued May 12, 1931. Contacts 6 of the distributor are closed when the distributor is idle and thus maintain the line circuit 206, 208 closed at such time. The rotation of the distributor in successive cycles is controlled by a clutch magnet 297 connected, through the lower contacts of the tight-tape arm 300, in series with conductors 302 and 303 of the start circuit. The stepping of the tape transmitter is effected by, or under control of, a cam on the distributor in known manner.

In the arrangement shown it is assumed that there will be a copious supply of perforated tape so that the tape transmitter will not be auto-stopped until a complete message has been transmitted. However, in the event of an auto-stop occurring during transmission of a message, K91 would be released and the ground removed from conductor 301. The tape may then be withdrawn from the transmitter and reinserted, and after the start button 308 is again depressed the way station selection character followed by a Space character will be retransmitted immediately prior to the information characters in the message. If it is desired to have retransmission continue automatically after an auto-stop, a relay arrangement similar to that employed at a way station, shown in Figs. 6 and 7, may be provided to automatically cause the Space character to be transmitted immediately prior to the resumption of the message.

A monitor printer 306 is connected in series with the transmitter contacts, and the printer has a cam-controlled contact 310 which closes when the end-of-message signal is transmitted by the tape transmitter and received by the monitor printer, the end-of-message signal comprising Figure Shift, H, and usually followed by Letter Shift.

When a message is to be sent, the start button 308 is depressed and, assuming that the contacts of the tape arm are closed, ground from the upper contacts of the tape arm is applied through conductor 298 and the start button 308 to energize the right hand coil of K91; K91 operates and locks up through its contacts 1, so that the push button 308 may be released. At its contacts 3 the operation of K91 applies a ground to conductor 301, which ground remains until the end-of-message signal causes the contacts 310 of the printer 306 to close, whereupon the circuit through contacts 2 of K91 and its left hand winding bucks the relay down, and ground is removed from conductor 301. The contacts 2 of K91 prevent the relay from reoperating inadvertently in the event that the printer contacts 310 should remain closed for a period after the end-of-message signal, or upper case H, was received.

If the line L of Fig. 11 is idle (K62 of Fig. 11 unoperated) the ground applied to conductor 301, Fig. 15, contacts 4 of K64, conductor 314, contacts T4 of K62, Fig. 11, and conductor 256, operates K66, Fig. 15, and K66 locks up through its contacts 6 to conductor 301. The ground from conductor 301 through contacts 4 of K64, conductor 314, contacts T6 and 7 of K62, Fig. 11, rectifier 289 and conductor 290, operates K76, Fig. 15; and from contacts T6 and 7 of K62, the ground over conductor 287 and rectifier 288, operates K63. K63 attempts to cause an invitation character to be sent, but the path for the probe pulse from segment 174 of the transmitting distributor 22, Fig. 9 (over conductors 176, 178, 180), to operate K75, Fig. 15, is broken at contacts 1 of K66. The operation of K76 at its contacts 4 opens the operating circuit of K77. Approximately 25 milliseconds after K76 operates, K77 releases at the end of this period because of its slow-to-release characteristic provided a resistance 279 bridged across its winding, closing the sending leg at contacts 1 of K77, which sends the 25 millisecond open to lock out all stations. The operation of K63, Fig. 11, starts the timing circuit for the gas tube V24, and when the tube fires it operates K62. With K62 and K66 operated, the short across the transmitter contacts is broken at contacts B2 of K62, and at contacts 4 of K66 to place the tape transmitter 294 in the sending leg. The transmitter control circuit is closed from conductor 302 through contacts 8 of K66 and conductor 304 and contacts B9 of K62, Fig. 11, to conductor 303.

If the invitation cycle is in progress (K62 operated), the tape transmitter can only be started at the end of an invitation cycle. If the invitation cycle is not to be repeated (K64 operated), K66 and K76 are operated as described above when K62 and K64 release. If the cycle is to be repeated, K83, Fig. 12, is operated. Ground from conductors 301 and 314 through armature 7 and contact T8 of K62, conductor 258, and contacts 7 of K83, Fig. 13, and conductor 256, operates K66 of Fig. 15. When K66 and K62 are operated, the transmitter contacts are in the sending leg and the control circuit is closed as described above.

At the end of the message and end-of-message signal, i.e., upper case H, causes contacts 310 of the printer 306 of Fig. 15 to close and complete a circuit through the left-hand winding of K91, causing the relay to release and at its contacts 3 remove the ground from conductor 301 which opens the holding circuit for K66. K66 at its contacts 4 allows the probe pulse to operate K75 to send the first invitation character. K66 is slow to release in order to allow the reader to be put back in the circuit at all stations.

*Automatic cycling circuit.*—The repeat cycle timer 280, Fig. 11, comprises two motor driven cams oriented with respect to each other on a common shaft so that each cam operates switches once every ten minutes. The cams are so adjusted as to have one switch 282 close 9.5 minutes after the other switch 281. When switch 281 closes, ground through contacts T1 of K62, conductor 284, and contacts 1 of K63 operates K52 which locks up through its contacts 5 and contacts T1 of K62. If there is any traffic, K62 is operated and K52 is not operated when the switch closes. When the other switch 282 closes, ground through the switch and contacts 3 of K52 and conductor 287 and rectifier 288 operates K63, and through conductor 290 operates K76, Fig. 15. K76 causes the 25 millisecond open to be sent out thus putting on the lockout at all way stations, and K63 starts the invitation cycle. If K62 is operated (invitation received) between the time the first switch 281 is closed and the time the second switch 282 is closed, K52 is released and K63 and K76 are not operated.

While the invention has been described with reference to particular embodiments thereof, it is not to be regarded as limited thereto since various modifications, substitutions and improvements will occur to those skilled in the art without departing from the spirit and scope of the invention as set forth in the appended claims.

What is claimed is:

1. In a telegraph way station system embodying a main station and a plurality of way stations and a way circuit interconnecting the main and way stations, and message transmitting and receiving equipments and associated control means at said way stations for operatively connecting the transmitting and receiving equipments selectively to the way circuit; means for transmitting to the way circuit selection signals respectively individual to the various way stations for inviting said way stations to transmit messages to said main station on a predetermined sequential basis which comprises means at said main station for initiating an invitation cycle by transmitting a selection signal individual to one of said way stations, said last named way station having its said control means responsive to its selection signal and including means operative to automatically transmit to the way circuit a selection signal individual to the next way station in the sequence in accordance with said predetermined sequential basis.

2. In a telegraph way station system embodying a main station and a plurality of way stations and a way circuit interconnecting the main way stations, and message transmitting and receiving equipments and associated control means at said way stations for operatively connecting the transmitting and receiving equipments selectively to the way circuit; means for transmitting to the way circuit selection signals respectively individual to the various way stations for inviting said way stations to transmit messages to said main station on a predetermined sequential basis which comprises means at the main station for initiating an invitation cycle by transmitting a permutation code character representing a selection signal individual to one of said way stations, said last named station having means responsive to said selection signal and including means operative to automatically transmit to the way circuit a permutation code character representing a selection signal individual to the next way station in the sequence in accordance with said predetermined sequential basis.

3. In a telegraph way station system embodying a main station and a series of way stations and a way circuit interconnecting the main and way stations, and message transmitting and receiving equipments and associated control means at said way stations for operatively connecting the transmitting and receiving equipments selectively to the way circuit; means for transmitting to the way circuit selection signals respectively individual to the various way stations for inviting said way stations to transmit messages to said main station on a predetermined sequential basis which comprises means at one of said stations for initiating a selection cycle by transmitting an invitation signal individual to one of said way stations, said one way station having its said control means responsive to said selection signal and including means operative to automatically transmit to the way circuit a selection signal individual to the next way station in the sequence, said next station and the remaining way stations in the series each having its said control means responsive to its selection signal from the preceding way station in the sequence and including means to automatically transmit to the way circuit the selection signal for the next way station in the sequence until said invitation cycle is completed.

4. In a telegraph way station system embodying a main station and a series of way stations and a way circuit interconnecting the main and way stations, and message transmitting and receiving equipments and associated control means at said way stations for operatively connecting the transmitting and receiving equipments selectively to the way circuit; means for transmitting to the way circuit selection signals respectively individual to the various way stations for inviting said way stations to transmit messages to said main station on a predetermined sequential basis which comprises means at said main station for initiating a selection cycle by transmitting an invitation signal individual to one of said way stations, said one way station having its said control means responsive to said selection signal and including means operative in the event that it has no message to transmit for automatically transmitting to the way circuit a selection signal individual to the next way station in the sequence in accordance with said predetermined sequential basis.

5. A system according to claim 4, including switch means settable for selectively closing out one or more of said way stations, and means at the main station responsive to the transmission by a way station of the selection signal of a closed out station for transmitting the selection signal of the next operating station in the sequence.

6. A system according to claim 4, including switching means for enabling certain of said way stations to send an allotted number of successive messages during an invitation cycle.

7. A system according to claim 4, in which the last way station in the invitation cycle has means responsive to its selection signal for transmitting a predetermined signal to the way circuit in the event that it has no message to transmit, and means at the main station responsive to said predetermined signal to indicate to the equipment there that the invitation cycle has been completed.

8. A system according to claim 4, in which each way station has a character-reading circuit and means for storing a request signal to signify that it has a message to transmit to the main station, means at a requesting way station responsive to the receipt of its individual selection signal and controlled by its stored request signal for transmitting to the way circuit a lockout signal, and means at the other way stations responsive to the last named signal for locking out their character-reading circuits to prevent them from reading the message traffic between the requesting way station and the main station.

9. A system according to claim 8, in which said main station has means automatically operative in the event that traffic has been received from any of the way stations during an invitation cycle for immediately resuming the invitation cycle.

10. A system according to claim 9, in which the main station has means responsive to the termination of message traffic between it and the requesting way station during a selection cycle for transmitting the invitation character of the next way station in the sequence.

11. In a telegraph way station system embodying a main station and a series of way stations and a way circuit interconnecting the main and way stations, and message transmitting and receiving equipments and associated control means at said way stations for operatively connecting the transmitting and receiving equipments selectively to the way circuit, means for inviting said way stations to transmit messages to said main station on a predetermined sequential basis which comprises means at said main station for initiating a selection cycle by transmitting an invitation signal individual to one of said way stations, means whereby certain of said way stations are enabled to send an allotted number of successive messages during an invitation cycle, said one way station having means responsive to said selection signal and including means operative in the event either that it has no message to send or if it has an allotted number of messages that it sends less than the allotted number, for automatically transmitting to the way circuit a selection signal individual to the next station in the sequence, said next station and the remaining way stations in the series each having means responsive to its selection signal from the preceding way station in the sequence and including means operative in the event either that it has no message to send or sends less than an allotted number, for automatically transmitting to the way circuit the selection signal for the next station in the sequence until said invitation cycle is completed.

12. A telegraph way station system embodying a main station and a series of way stations and a way circuit interconnecting the main and way stations, message transmitting and receiving equipments and associated control means at said stations for operatively connecting the transmitting and receiving equipments selectively to the way circuit, said way message transmitting equipment at a way station comprising means including a keyset and buffer storage means for producing and temporarily storing a series of signal code conditions representing a keyset message and distributor means for transmitting permutation code signals representing said signal code conditions, said receiving equipment at the main station comprising means for receiving the keyset message from an invited way station and means responsive thereto for transmitting to the calling station signals representing keyset answer-back information, said receiving equipment at the way station including indicating means for displaying said keyset answer-back information, means for transmitting to the way circuit selection signals respectively individual to the various way stations for inviting said way stations to transmit such keyset messages to said main station on a predetermined sequential basis which comprises means at said main station for initiating a selection cycle by transmitting an invitation signal individual to a predetermined one of said way stations, said predetermined way station having means responsive to said selection signal and including means operative in the event that it has no message to send for automatically transmitting to the way circuit an invitation signal individual to the next station in the sequence in accordance with said predetermined sequential basis.

13. A telegraph way station system embodying a main station and a series of way stations and a way circuit interconnecting the main and way stations, message transmitting and receiving equipments and associated control means at said stations for operatively connecting the transmitting and receiving equipments selectively to the way circuit, said way message transmitting equipment at each way station comprising means including a keyset and buffer storage means for producing and temporarily storing a series of binary code signals representing a keyset message and distributor means for transmitting permutation code telegraph signals representing said binary code signals, said receiving equipment at the main station comprising means including a distributor for receiving said permutation code signals from an invited way station and translating them into said binary code signals, means for applying said binary code signals to input circuits of data processing means, means for storing other binary code signals representing keyset answer-back information in response to said keyset message, means including a distributor for transmitting permutation code telegraph signals representing said binary code answer-back signals, said receiving equipment at the way station including means for receiving said last named permutation code signals and indicating means controlled in accordance therewith for displaying said keyset answer-back information, means for transmitting to the way circuit selection signals respectively individual to the various way stations for inviting said way stations to transmit such keyset messages to said main station on a predetermined sequential basis which comprises means at said main station for initiating a selection cycle by transmitting an invitation signal individual to a predetermined one of said way stations, said predetermined way station having means responsive to said selection signal and including means operative in the event that it has no message to send for automatically transmitting to the way circuit a selection signal individual to the next station in the sequence in accordance with said predetermined sequential basis.

14. A system according to claim 13, in which said message transmitting and receiving equipments at said main and way stations include means for producing and transmitting teleprinter messages and a recorder for recording incoming teleprinter messages, said transmitting equipment at each invited way station including means for transmitting predetermined functional signals respectively to indicate whether the message following is a said keyset message or a teleprinter message, means at the main station responsive to said functional signals for directing incoming keyset messages to said data processing input circuits and for directing incoming teleprinter messages to a recorder, said equipment at the main station including means for transmitting predetermined functional signals respectively to indicate whether the message following is keyset answer-back information or a teleprinter message, and means at the way station responsive to the last named functional signals for directing keyset answer-back information to said indicating means and for directing a teleprinter message to a recorder.

15. A system according to claim 13, in which said message transmitting and receiving equipments at said main and way stations include a tape transmitter and distributor for producing and transmitting teleprinter messages and a printer for recording incoming teleprinter messages, said transmitting equipment at each invited way station including means for transmitting predetermined functional signals respectively to indicate whether the message following is a said keyset message or a teleprinter message, means at the main station responsive to said functional signals for directing incoming keyset messages to said data processing input circuits and for directing incoming teleprinter messages to a printer, said equipment at the main station including means for transmitting predetermined functional signals respectively to indicate whether the message following is keyset answer-back information or a teleprinter message, and means at the way station responsive to the last named functional signals for directing keyset answer-back information to said indicating means and for directing a teleprinter message to a printer.

16. A system according to claim 14, including means to prevent the main station from transmitting a teleprinter message to a way station except when the way circuit is idle or at the end of an invitation cycle.

References Cited in the file of this patent

UNITED STATES PATENTS

| | | |
|---|---|---|
| 2,238,142 | Weaver | Apr. 15, 1941 |
| 2,419,729 | Potts | Apr. 29, 1947 |
| 2,501,063 | Levin | Mar. 21, 1950 |
| 2,502,654 | Keyes | Apr. 4, 1950 |
| 2,667,533 | Zenner | Jan. 26, 1954 |
| 2,766,318 | Bacon et al. | Oct. 9, 1956 |